March 29, 1955    H. DAUBER    2,705,319
DETECTION OF CHANGES IN TERRAIN REFLECTION COEFFICIENT
Filed May 7, 1943    9 Sheets-Sheet 1
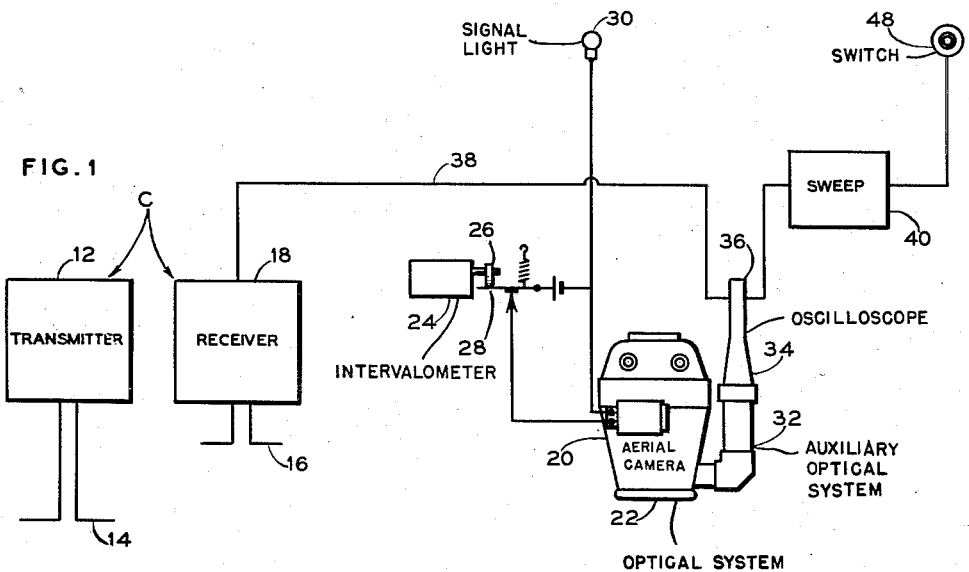
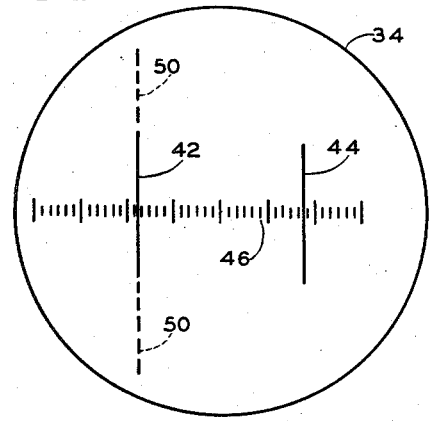
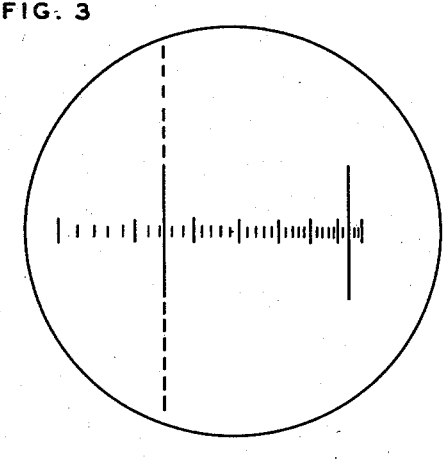
*INVENTOR*
HARRY DAUBER
BY Harry M. Saragovitz
*ATTORNEY*

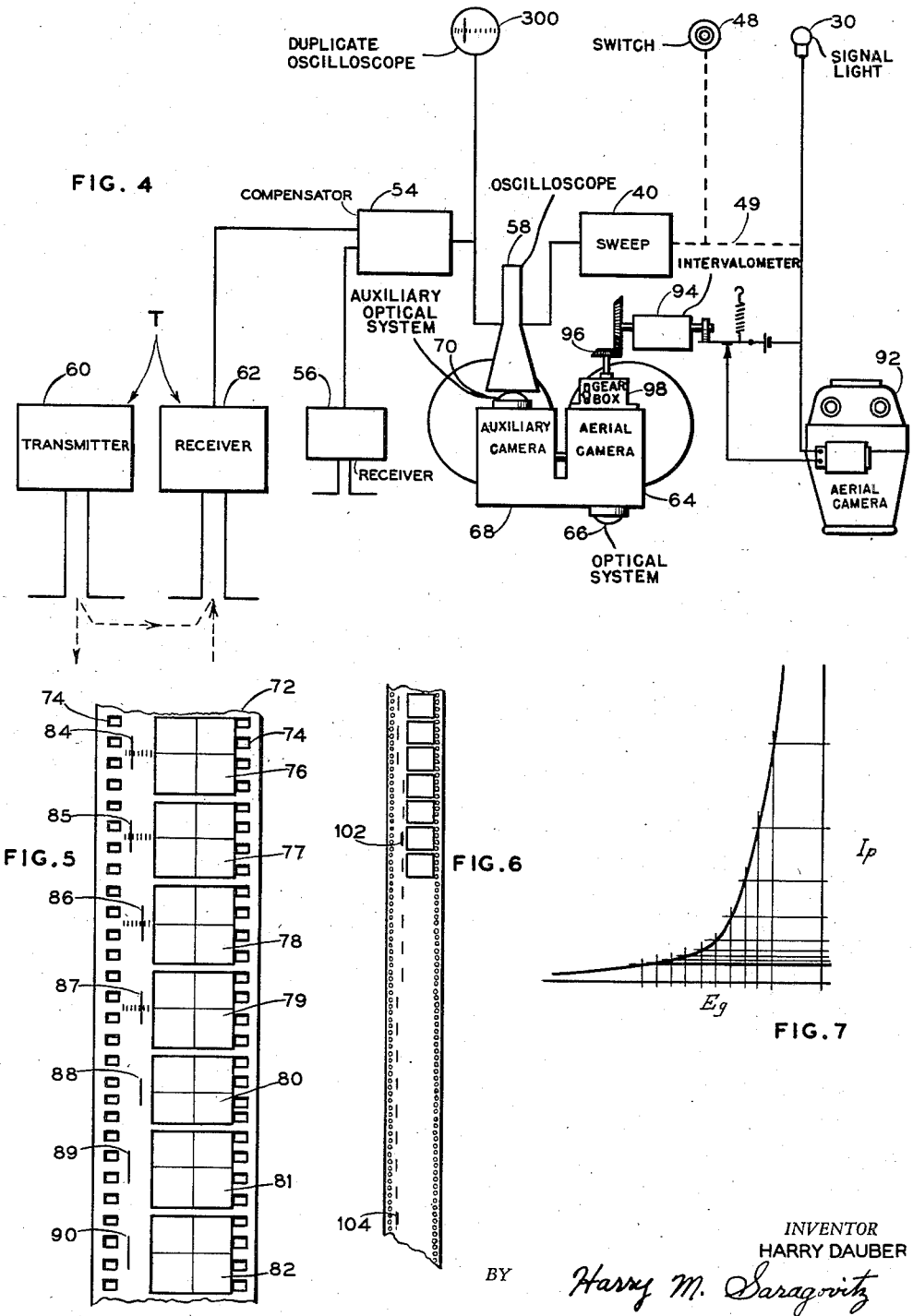

March 29, 1955
H. DAUBER
2,705,319
DETECTION OF CHANGES IN TERRAIN REFLECTION COEFFICIENT
Filed May 7, 1943
9 Sheets-Sheet 3
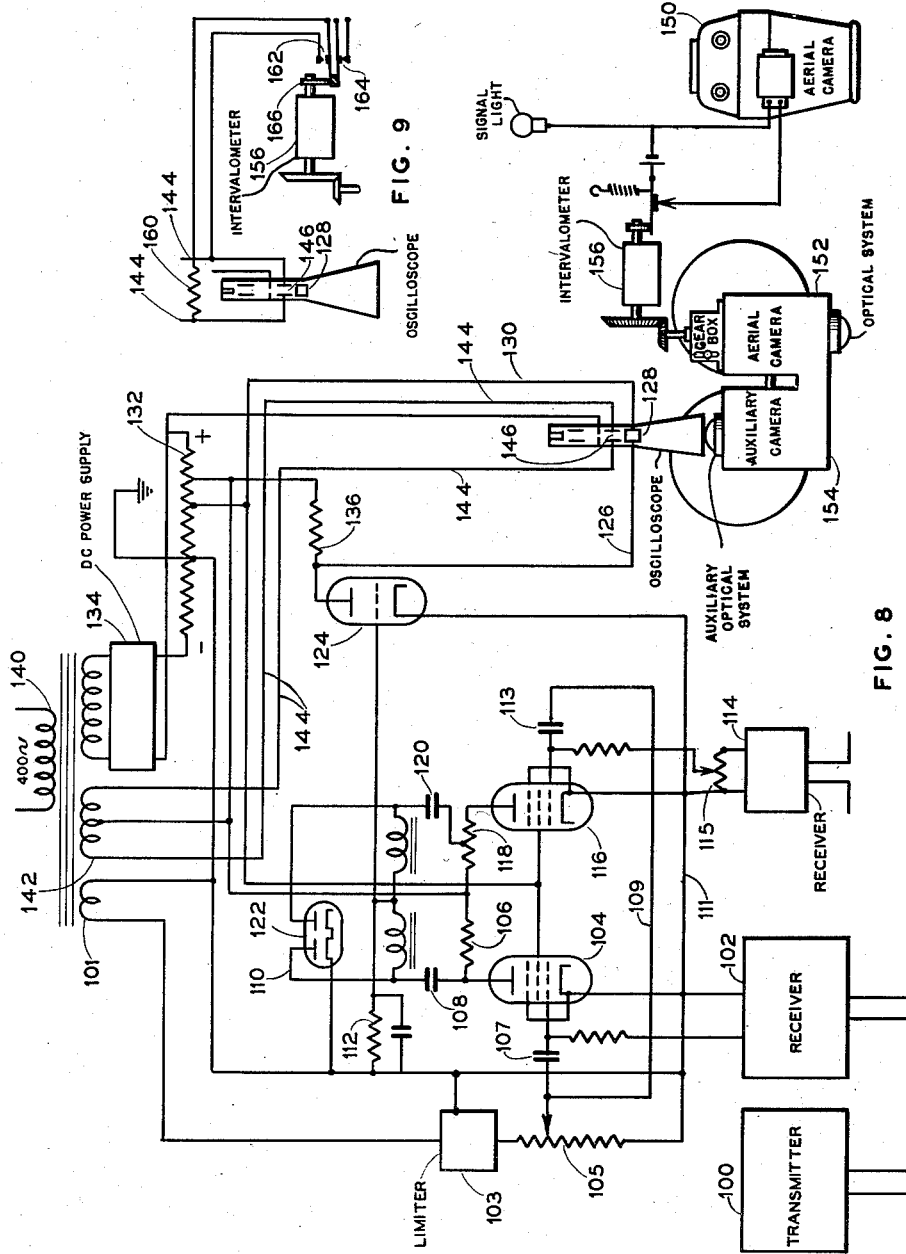
INVENTOR
HARRY DAUBER
BY Harry M. Saragovitz
ATTORNEY

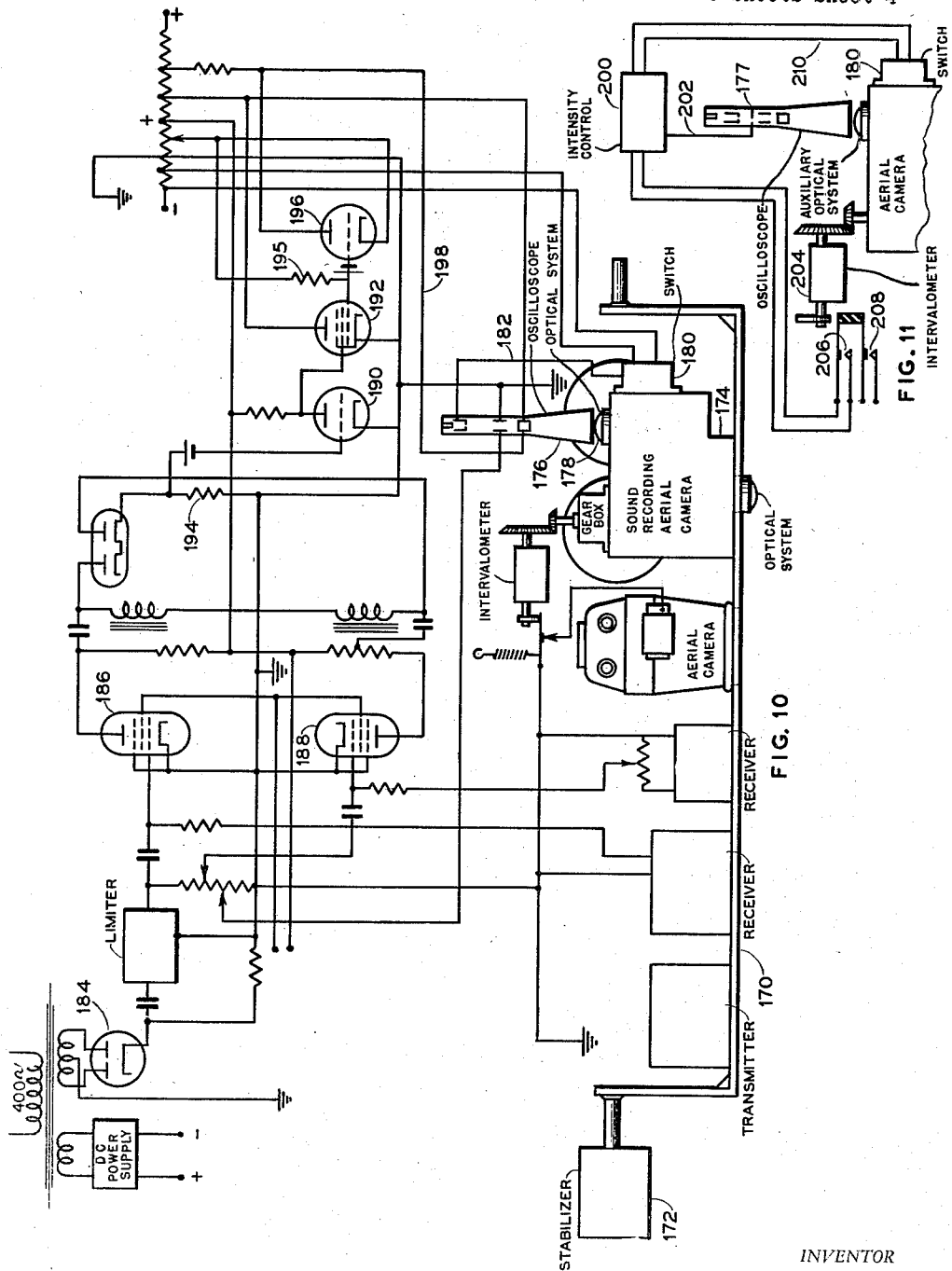

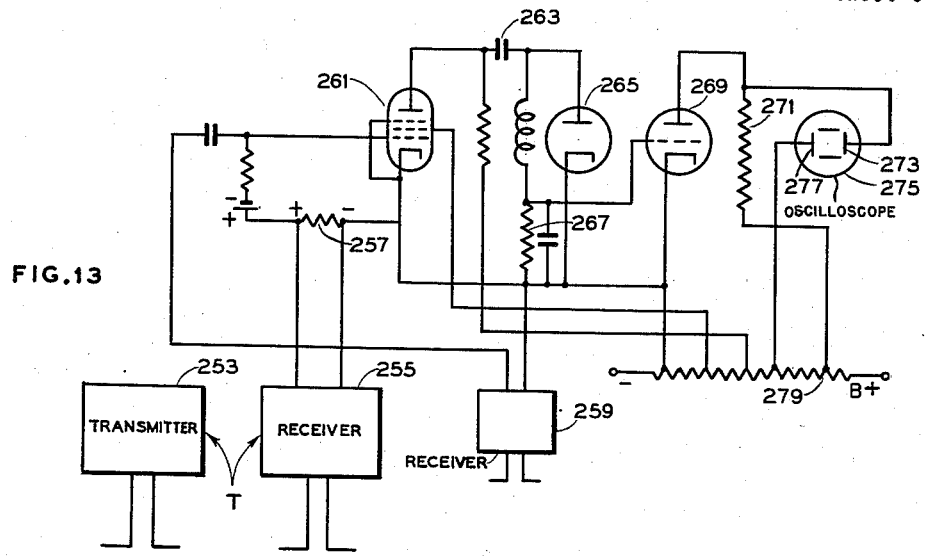
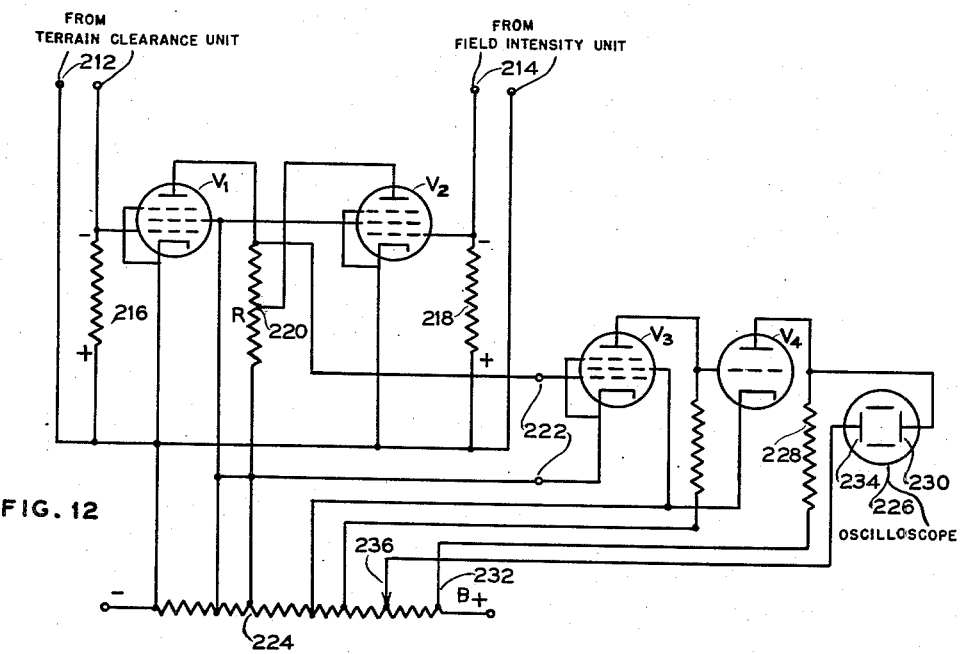

March 29, 1955 H. DAUBER 2,705,319
DETECTION OF CHANGES IN TERRAIN REFLECTION COEFFICIENT
Filed May 7, 1943 9 Sheets-Sheet 6
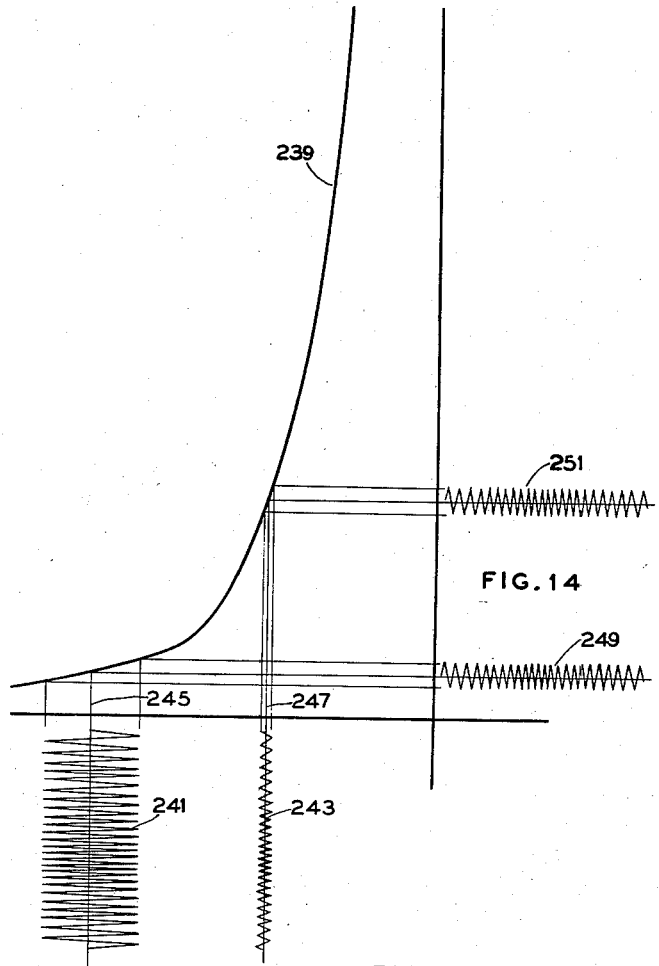
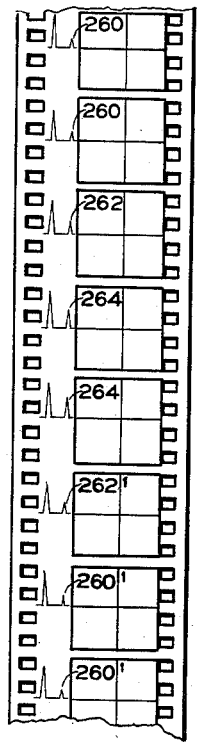
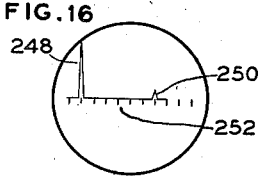
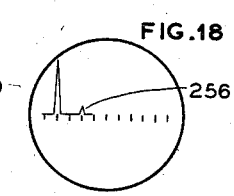
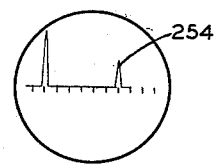
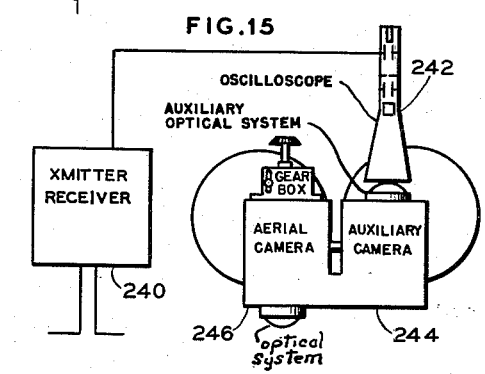
INVENTOR
HARRY DAUBER
BY
Harry M. Saragovitz
ATTORNEY INVENTOR.
HARRY DAUBER
BY
Harry M. Saragovitz
Attorney INVENTOR.
HARRY DAUBER
BY
Harry M. Saragovitz
Attorney

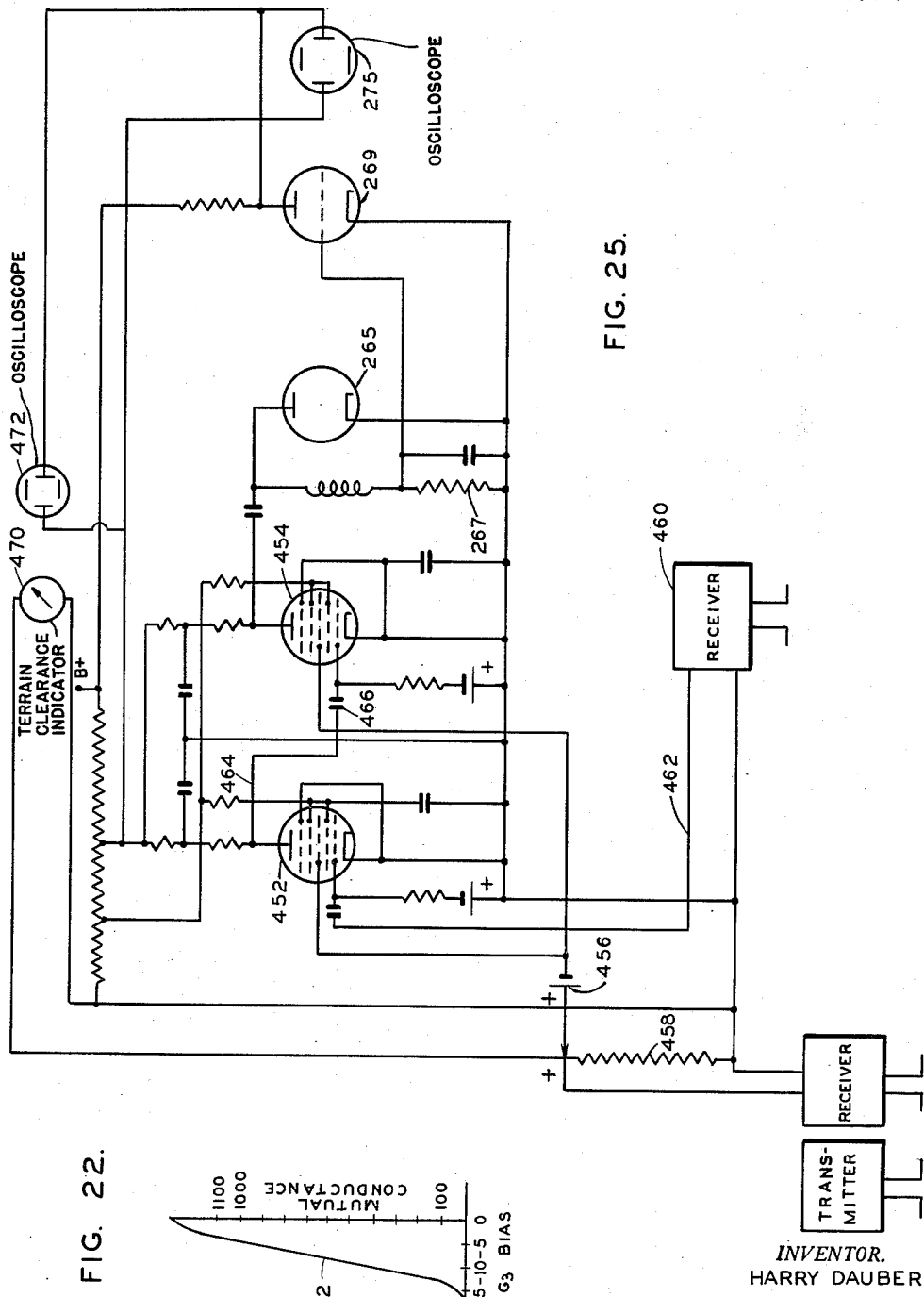

United States Patent Office 2,705,319
Patented Mar. 29, 1955

2,705,319

DETECTION OF CHANGES IN TERRAIN REFLECTION COEFFICIENT

Harry Dauber, New York, N. Y.

Application May 7, 1943, Serial No. 486,020

28 Claims. (Cl. 343—7)

(Granted under Title 35, U. S. Code (1952), sec. 266)

The invention described herein may be manufactured and used by or for the Government for governmental purposes, without the payment to me of any royalty thereon.

This invention relates to the detection of changes in terrain reflection coefficient for radio waves, and more particularly to apparatus to detect and to fix the location of camouflaged military installations.

To detect camouflage the present procedure is to carefully study aerial photographs, but good camouflage is difficult to detect. The primary object of the present invention is to provide an improved method and apparatus to detect and to fix the location of camouflaged military installations, industrial plants, oil tanks, ammunition dumps, and other such concentrations of metal parts. In peace time the invention is useful for the detection of swamp land, open mineral deposits, or other composition causing a change in terrain reflection coefficient. The invention makes use of a radio wave projected downwardly from an aircraft, and depends on the difference in reflection of the radio wave which takes place with a change in terrain condition. For example, it has been found, using a radio frequency of 200 mc., that the reflection coefficient is about 42 percent for dry sand, 52 percent for soil and for grass, 98 percent for salt water and for iron wire netting of ½-inch mesh, and 100 percent for copper gauze. Thus, if the camouflage is supported on wire netting, there will be an abrupt increase in the reflection coefficient, and if, on the other hand, the camouflage is supported on rope netting, the downwardly-projected radio wave will readily penetrate such camouflage and be reflected from the concentrated metal objects therebeneath.

A further object of the invention is to fix the location of points of interest by taking photographic records of the terrain and associating such records with indications of the reflection coefficient of the photographed terrain.

The intensity of the terrain-reflected radio wave depends not only on the reflection coefficient of the terrain, but also on the height of the aircraft-carried apparatus. The electric field intensity varies inversely with the distance in linear relation, while power varies inversely as the square of the distance. A further object of the present invention is to make the response of an indicator depend solely on the reflection coefficient, and to eliminate any changes which may be caused by a change in "terrain clearance," whether caused by a change in altitude of the aircraft, or by a change in elevation of the terrain. With this object in view, the apparatus preferably includes means responsive to terrain clearance arranged to so vary the response of the reflection-coefficient indicator as to compensate for changes in terrain clearance.

As so far described, the apparatus might employ simply a conventional aerial camera, for such cameras already include an auxiliary optical system for recording on each photograph the indications of certain instruments, for example an altimeter, a turn and bank indicator, and a clock. For the present purpose, it would be necessary merely to have the said auxiliary optical system also record the indication of the reflection-coefficient indicator. However, these large aerial cameras are exposed somewhat infrequently (the interval used depending on the height and speed of the plane), because a considerable area is covered by each large photograph. This is a disadvantage for the present purpose, for a camouflaged point of interest may be missed or not acurately fixed. An indication corresponding to a small camouflaged area may be skipped entirely between successive exposures, unless the momentary deflection of the reflection coefficient instrument occurs at the instant of exposure. Moreover, the aircraft may follow a curved instead of a straight path between successive photographs. These troubles might be overcome by speeding up the camera exposure rate to a very fast value, but that would be wasteful, considering the large size of the picture taken, and the small area to which the radio beam is preferably confined. Moreover, the usual film supply in the camera would be inadequate if rapidly exposed.

It is accordingly a further object of my invention to overcome the foregoing difficulty, which I do by using a high-speed camera working with a small film. Most conveniently, a motion picture camera is used, preferably driven by an outside drive making its exposure rate variable over a large speed range from, say, 5 to 50 or more exposures per second. The slow exposure rate is adequate for aircraft which are flying high and slow, while a faster exposure rate is needed for aircraft flying low and fast.

The small pictures obtained in this manner are good for accurate correlation with the reflection coefficient instrument, but are not as well suited for photographic study as are the large pictures taken by the conventional large aerial cameras. A further object of my invention is to combine the advantages of both, and for this purpose the complete apparatus includes not only a motion picture camera but also a conventional aerial camera, the two being geared together or synchronized with a substantial difference in speed, there being, say, 10 to 300 exposures of the small camera for each exposure of the large (depending on the interval at which the large camera is exposed). The small film, with its pictorial record of the reflection coefficient, will indicate any suspected camouflaged point, and that in turn may be located for further study on the large picture by means of conspicuous objects or so-called "control points."

To accomplish the foregoing and other objects which will hereinafter appear, my invention resides in the method steps and apparatus elements, and their relation one to the other as hereinafter are more particularly described in the specification and sought to be defined in the claims. The specification is accompanied by drawings in which:

Figure 1 is a block diagram of a simple form of apparatus embodying features of my invention;

Figure 2 shows the screen of an oscilloscope used to indicate the reflection coefficient;

Figure 3 is a similar view showing an oscilloscope screen marked in accordance with a logarithmic scale;

Figure 4 is a block diagram of a more complete apparatus embodying further features of the invention;

Figure 5 shows a strip of motion picture film, and is explanatory of the invention;

Figure 6 shows a piece of film drawn to smaller scale;

Figure 7 is a characteristic curve for a variable mu tube;

Figure 8 is a schematic wiring diagram for one form of my invention;

Figure 9 is explanatory of a detail;

Figure 10 is a schematic wiring diagram for another form of my invention;

Figure 11 is explanatory of a detail;

Figure 12 is a schematic wiring diagram of a simplified combining circuit using D. C. currents;

Figure 13 is a schematic wiring diagram of a simplified combining circuit using only a single variable mu tube;

Figure 14 is explanatory of the operation of the circuit shown in Figure 13;

Figure 15 is a block diagram for another form of the invention;

Figures 16–19 show the oscilloscope screen trace obtained with the apparatus of Figure 15;

Figure 20 shows a piece of motion picture film obtained with the apparatus of Figure 15;

Figure 22 is a curve showing a characteristic of a 6L7 pentagrid mixer amplifier tube, which may be used in the circuit of Figure 21;

Figure 25 is a schematic wiring diagram for a circuit in which compensation for terrain clearance is obtained in accordance with a square law by the use of two linear tubes operated in cascade.

Figure 21:
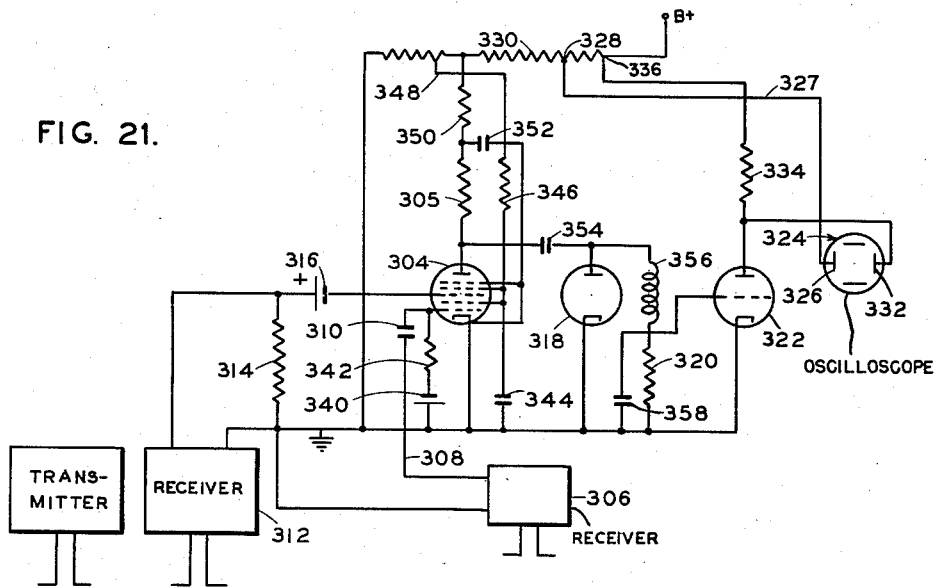
Figure 21 is a schematic wiring diagram for a circuit which compensates in linear relation to terrain clearance.

Referring to the drawing, and more particularly to Figure 1, the air-craft apparatus includes a downwardly-aimed camouflage detector generally designated C, an instrument 36 responsive thereto, and a camera 20, the latter having an optical system 22 for photographing the terrain, and an auxiliary optical system 32 for photographing the indications of the instrument 36. The camera 20 operates periodically, and provides successive pictures of the terrain, each of said pictures being accompanied by an indication of the reflection coefficient at that point.

The camouflage detector C includes a transmitter 12 feeding an antenna array 14 which directs a radio beam downwardly. The frequency used is preferably high enough to permit the use of a conveniently small antenna array having good directivity, so that the projected lobe will be a narrow one.

The radio energy reflected upwardly from the ground is collected on another preferably directive antenna array 16, connected to a receiver 18. The antenna 16 is preferably disposed higher than the antenna 14, or is otherwise appropriately shielded to prevent reception directly from the transmitting antenna 14. Theoretically, it is sufficient if either the antenna 14 or the antenna 16 is highly directive, instead of both, as here described, but the latter is more efficient and less subject to interference.

The particular apparatus here illustrated uses a large aerial camera. The camera is exposed periodically at a predetermined rate, and for this purpose a conventional intervalometer 24 may be used. The schematic diagram of Figure 1 includes a motor-driven cam 26 operating a switch 28 for a local circuit which exposes the camera, and which also flashes a signal light 30 in front of the pilot or photographer in order to show that the camera is operating.

Some aerial cameras are provided with an auxiliary optical system for photographing certain instruments (usually an altimeter, a watch, and a turn and bank indicator). For the present invention such an auxiliary optical system may be directed at the reflection coefficient instrument 36. In the present case the instrument 36 is an oscilloscope, and the auxiliary optical system 32 is directed at the oscilloscope screen 34. The oscilloscope may be very small in order to minimize the size and weight of the complete apparatus. The output of receiver 18 is applied to a pair of deflecting electrodes in the oscilloscope, so that the position of the spot depends on the intensity of the reflected radio wave.

A sweep wave source 40 is preferably provided, and is connected to the other pair of deflecting electrodes so that the spot is swept at relatively high speed in a transverse direction. A sawtooth wave is unnecessary, and a sine wave is satisfactory, for there will be a number of oscillations at each position of the spot. Referring to Figure 2, the cathode ray screen 34 then will show a trace in the form of a vertical line, say the line 42, which in the event of a large change in reflection coefficient will be shifted sidewardly to a position such as that indicated at 44. Advantages of using a sweep wave are, first, to prevent excess halo causing inaccurate large spot formation; second, because it is easier to see and to read the position of a line instead of a spot; and third, to avoid overheating and damage of the screen material in the event of the aircraft flying a long distance over uniform terrain (causing the spot to remain stationary).

The screen of the oscilloscope may be provided with a scale 46, calibrated in terms of reflection coefficient. This is convenient, but not essential. A uniform scale is shown in Figure 2. With some circuits the scale will be logarithmic or exponential, as is later explained. A screen with such a scale is shown in Figure 3, and it will be noted that the logarithmic scale is not inconvenient to use because the useful range is only from, say, 40 to 100 percent and is not grossly non-uniform.

If desired, a manually operable means may be provided so that the pilot or observer can mark for later study a particular point of which he is suspicious. For this purpose I have provided a push button switch 48, which in the present case varies the length of the sweep. This may be done, for example, by short-circuiting the gain control of the sweep wave generator. At such a marked point the vertical trace will be distinguishable by being prolonged lengthwise, as is indicated by the dotted extension 50 in Figure 2.

Figure 4 of the drawing shows a more complete apparatus. A most important feature added in Figure 4 is a means to automatically compensate for changes in terrain clearance. For this purpose the apparatus includes a device T responsive to terrain clearance, the response of which is applied to a compensator 54 connected between the reflection coefficient receiver 56 and the cathode ray tube 58. The compensator contains a network so designed as to properly compensate for changes in terrain clearance.

Various terrain clearance devices may be used. Some rely on sonic or radio pulse echo. Some rely on change in capacitance to ground. The particular terrain clearance device with which I am most familiar is a known type using a frequency-modulated transmitter 60, and a receiver 62 in which the transmitted and received waves are heterodyned. (See, for example, article by L. Espenschied and R. C. Newhouse, entitled "A terrain clearance indicator," published January 1939 in the Bell System Telephone Journal, vol. 18, p. 222.) The frequency difference is a measure of the terrain clearance, and a direct current is obtainable which is proportional to the terrain clearance. This current has heretofore been used to operate a terrain clearance indicator, but in the present case the current is employed in the compensator 54.

The complete apparatus of Figure 4 also differs from the elemental introductory apparatus described in Figure 1 in employing both a large slow-speed aerial camera and a small high-speed camera of the motion picture type. Specifically, a motion picture camera 64 has a downwardly-directed optical system 66 to take pictures of the terrain. An auxiliary camera 68 has an optical system 70 directed toward the screen of the oscilloscope 58. Two motion picture cameras may be used, these cameras 64 and 68 being substantially alike and being geared together for synchronous operation, and the film being fed directly from one to the other through a connecting dark film passage. The camera 64 exposes a large part of the film width, and the camera 68 exposes a marginal strip of film extending longitudinally of the film alongside the part exposed by camera 64.

Referring to Figure 5 of the drawing, the motion picture film strip 72 may be a conventional film with the usual sprocket holes 74. The film may be either 16 mm. or 35 mm. in width, the latter being preferable where the limitations in size and weight of the aircraft-carried apparatus are not too severe. The successive frames or exposures are indicated at 76 through 82. The crossed hair-lines indicated on these frames are produced by the optical system. The oscilloscope trace and reflection coefficient scale are reproduced alongside the frames, as is indicated at 84 through 90. It will be noted that in the particular film strip here shown, the traces 86, 87, and 88 are displaced sidewardly, while the traces 84, 85, 89 and 90 are superposed. Thus, the traces 86—88 indicate a point of interest, and may be associated with their corresponding picture frames.

If a special motion picture camera is designed and used, said camera having two optical systems for simultaneous exposure on one part of the film, the picture frame 78 would show the terrain related to the trace 86, and so on. This would be very convenient, and I believe that such a special camera should be used. However, in the present case, for the sake of immediate availability, it has been assumed that two substantially standard motion picture cameras are to be employed, and in such case one must allow for a distance along the film corresponding to the length of the film required between the exposure point of the camera 64 (Figure 4) and the exposure point of the auxiliary camera 68. This amount is known, and if it happens to be, say, 20 frames, then 20 fames are counted away from the trace 86 to locate the picture frame corresponding thereto.

If the camera is operating at high speed, or if the camouflaged military objective is large in area, there will, of course, be a considerable number of displaced traces such as the trace 86, which will themselves form a line displaced from the line formed by the traces 84, 85, 89, and 90. This is indicated in Figure 6. The fact is of interest for the reason that in examining the film it may be moved quite rapidly, depending, of course, on the speed at which the film was moved during the recording operation. For this examination, the film may be projected on a screen, or it may be viewed through known forms of magnifying film-viewer. The successive traces will form a line, any sideward displacement of which will be readily noticeable, whereupon the film may be stopped for closer examination.

The complete apparatus of Figure 4 preferably also employs a standard aerial camera 92 of large size. The camera 92 provides large, clear photographs for detailed study. The exposures of camera 92 are preferably made synchronous with those of camera 64. This may be done through the intervalometer 94, which not only controls the camera 92 as usual, but also is geared at 96 to camera 64. The ratio may be a matter of 30 to 1, or more. In fact, a change-speed gear box 98 is preferably employed between intervalometer 94 and camera 64, thus making it possible to select a desired one of several ratios. It will be understood that any selected frame on the motion picture film may later be located as a small area on the large picture by examining both pictures for common conspicuous points, or so-called control points.

The signal light 30, the switch 48, and sweep wave generator 40 of Figure 4 are the same as the correspondingly-numbered parts in Figure 1. Manual control 48 for increasing the sweep is optional, and if desired an alternative connection 49 may be used in lieu of the manual control 48. This will automatically provide an increased sweep length each time the large camera 92 is exposed, and so will locate corresponding pictures in the small and large cameras, for the characteristic increased sweep on the small film will correspond to the instant exposure of the large picture.

Other means of providing an identifying mark may be provided, and one such means later mentioned is applied to the intensity grid of the oscilloscope and increases the spot size in order to widen the thickness of the trace. This is shown at 102 and 104 in Figure 6. With such an arrangement, the manual control and the automatic control may both be used in a single circuit, one of these controls being used to increase the length of the trace, and the other being used to increase the thickness of the trace.

Still another means for marking the motion picture film in synchronism with the large film includes the use of an extra lamp and slit arrangement, the said lamp being energized (or shuttered open) at the instant of exposure of the large film. Such a lamp and slit arrangement may be used to produce a horizontal line at one side of the oscilloscope line or crossing the oscilloscope line without affecting the oscilloscope trace itself.

It may be mentioned that it is not essential to synchronize the motion picture camera and the aerial camera. The necessary location may be determined solely by recognition of control points. However, it is convenient to have a synchronized relation so that the related pictures can be determined by mechanical counting or spacing as an aid to the search for control points. Even with synchronization it is not essential to have marking points on the motion picture film, but these again are an aid to determining the related pictures by mechanical counting.

It may be preliminarily explained that the electric field intensity varies in linear relation inversely with the distance of the receiver from the transmitter, while the power available at any point varies inversely in accordance with the square of the distance. Most receivers are made responsive to electric field intensity. At extremely high frequencies detectors are frequently used which respond according to a square law or to an exponential function of an order higher than two. Iron pyrite crystals generally act according to a square law, so that the rectified current is proportional to the square of the applied voltage. Since it is the object of this invention to present means for compensation, rather than specific receivers for receiving high frequency electromagnetic waves, means are shown in the following description which can be applied to receivers responding either to the electric field strength, or to the power developed in a resonant pickup device. In the one case, the compensation for terrain clearance must be made in linear relation to the height (really twice the height) of the plane. In the other case, the compensation must be made in accordance with the square of the double-height of the plane. In terms of gain, the gain must be increased for increased height, and in terms of attenuation, the attenuation must be decreased for increased height.

A wiring diagram for a simple form of my invention is shown in Figure 21. This arrangement is relatively simple because the correction is made a linear one, and also because a range of attenuation of from one to ten is considered adequate. This range (corresponding to, say, 250 to 2,500 feet, or, say, 2,500 to 25,000 feet) may be obtained in a single tube. As a preferred example among currently available tubes now known to me, I may refer to the 6L7 pentagrid mixer amplifier tube. An important characteristic of that tube is shown in Figure 22, in which curve 302 shown the variation in mutual conductance as a function of negative bias applied to the number three grid of the tube. It will be observed that curve 302 is almost perfectly linear over a range of mutual conductance of 100 to 1,000 umhos, and that this change is readily obtained by a reasonable range of grid bias within, say, 10 volts. For this tube the amplification is proportional to the transconductance if a load resistor which is small compared to the plate resistance is used. It should be understood that a reduction in negative bias causing an increase in mutual conductance leads to an increase in amplification. It therefore follows that if an increase in terrain clearance is so used as to cause a reduction in negative bias, a compensatory increase in amplification may be provided to make up for the increased height of the plane.

Reverting now to Figure 21, the 6L7 tube is shown at 304. The output of the field intensity receiver 306 is applied to the number one grid of tube 304 by means of conductor 308 and blocking condenser 310. Terrain clearance receiver 312 provides a current which is proportional to the terrain clearance, and this is applied across a resistor 314, so developing a potential which is proportional to terrain clearance. The number three grid of tube 304 is normally biased to maximum negative potential on the linear part of the G1-to-plate characteristic by means of a bias battery 316. The potential developed across resistor 314 is used to counteract the negative bias of battery 316, so that increases in terrain clearance reduce the negative bias on the number three grid, thereby increasing the amplification factor of the tube, as was described in connection with Figure 22.

The RF output voltage of tube 304, developed across plate impedance 305, is rectified in a diode rectifier 318, the rectified current from which flows through a resistor 320, the voltage across which is applied to the grid of a linear D.-C. amplifying tube 322, which in turn is connected to the horizontal deflecting plates of an oscilloscope 324.

It will be observed that a left-hand deflecting plate 326 is connected by means of conductor 327 to a point 328 on a voltage-dividing resistor 330 forming part of a suitable power supply source. The potential thus applied to plate 326 is positive for minimum terrain reflection coefficient, and attracts the electron beam toward the left end of the scale. The deflecting plate 332 is connected to the anode of amplifier tube 322, and also through a plate resistor 334 to a point 336 on voltage divider 330. Point 336 is more positive than point 328, but the difference in potential between the poins 328 and 336 is more than overcome by the voltage drop in resistor 334, so that deflecting plate 332 is less positive than plate 326 (for minimum reflection coefficient).

Suppose the aircraft is flying at constant elevation over a region of small reflection, such as a desert. In such case there will be a minimum signal from receiver 306, causing minimum negative biasing voltage to be developed across resistor 320, and consequently causing maximum current to flow through amplifier tube 322. This produces maximum voltage drop across resistor 334, and therefore minimum voltage on the right-hand deflecting plate 332. The electron beam will therefore be drawn to the relatively-positive deflecting plate 326, and the oscilloscope trace will be at the left-hand end of the scale. If now the aircraft passes over a wire netting or a region of concentrated metal, such as an ammunition dump, the reflection coefficient will be a maximum, with consequent maximum signal from receiver 306, thus providing maximum current and potential across resistor 320, and this being a negative biasing potential, there is consequently minimum current through tube 322 and therefore minimum loss of potential at resistor 334, so that deflecting plate 332 becomes positive relative to deflecting plate 326. The electron beam is therefore drawn to the right, which is as it should be.

Before leaving the circuit of Figure 21, it may be mentioned that the number one grid of tube 304 is normally biased by means of a bias battery 340, connected through a grid impedance 342. The numbers two and four grids of tube 304 are used as screen grids, and are connected to a decoupling network including a condenser 344 and resistor 346, connected at 348 to the power supply. The number five grid is used as a suppressor grid, and is connected directly to the cathode. Resistor 350 and condenser 352 form a decoupling circuit for the purpose of keeping R. F. out of the power supply. Condenser 354 is a blocking condenser. Choke 356 is an R. F. impedance in the diode circuit and has a low resistance for D. C. Condenser 358 bypasses R. F. around resistor 320.

Figure 23:
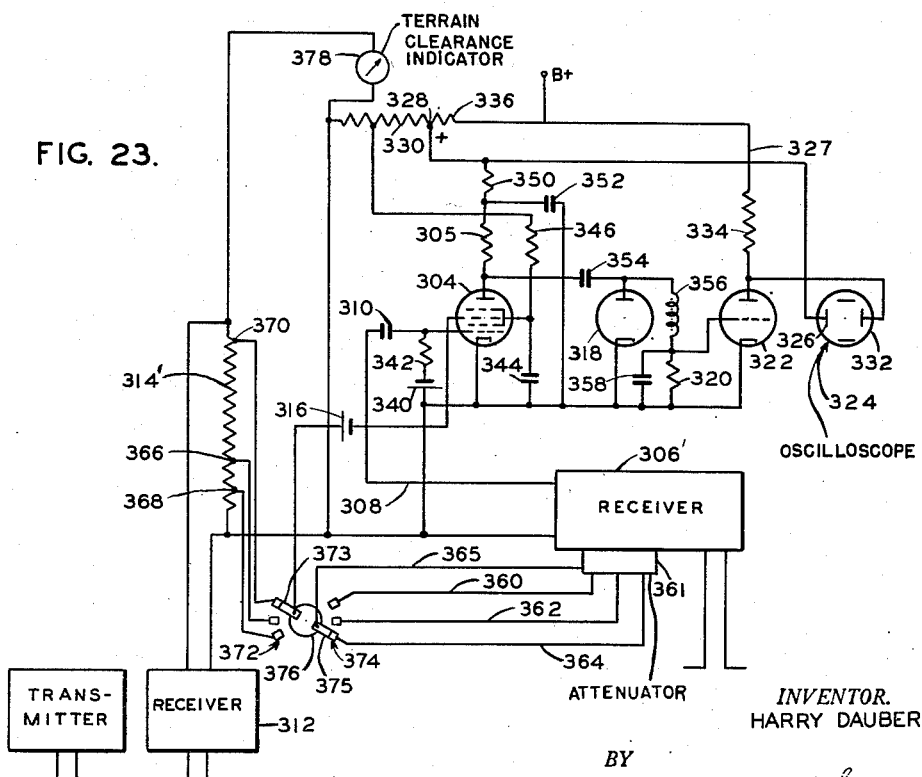
Figure 23 is a schematic wiring diagram for a circuit generally like that shown in Figure 21, but having multiple ranges of terrain clearance.

As so far described, the aircraft may be used over a considerable range of altitude but only within a specified range, say 250 to 2,500 feet, or 2,500 to 25,000 feet. To overcome this limitation, Figure 23 shows a modification of the circuit shown in Figure 21 in which a plurality of such ranges may be covered by the simple act of manually changing the position of a single switch. In Figure 23, three switch positions are shown, thus providing three ranges, but it will be understood that two or four may also be provided by corresponding changes in the circuit. For all practical purposes, three ranges are more than adequate, because the maximum useful elevation is limited by the desire for good photographic response, and, even assuming that satisfactory photographs may be taken at 25,000 feet, the three-range unit of Figure 23 will cover a total range of from 25 to 25,000 feet, the first range being 25 to 250 feet; the second range 250 to 2,500 feet; and the third, 2,500 to 25,000 feet.

Referring now to Figure 23, the circuit comprises tubes 304, 318, 322 and an oscilloscope 324, exactly as previously described in connection with Figure 21. These tubes and most of the associated circuit parts have been correspondingly numbered in both diagrams, in order to avoid the need for repetition of the description. Confining attention solely to the changes made in Figure 23, it may be explained that receiver 306' corresponds to receiver 306 in Figure 21, but differs in being provided with a constant-impedance attenuator operating step-by-step and, in the present case, having three steps corresponding to an output of one, one-tenth, and one-hundredth. Connections for producing these attenuation steps are indicated by the conductors 360, 362, 364, and return conductor 365, leading to an electromagnetic remote control mechanism 361 which activates movement of the attenuator switch. The attenuator is preferably located in the intermediate frequency amplifier of the receiver where there is ample signal strength, but it can be used elsewhere, as, for example, in the R. F. amplifier. The particular nature of the attenuator network need not be described, many forms being known, and the selection of the best form depending on the particular location of the attenuator network in the receiver circuit.

If there were no compensation for terrain clearance, the attenuator so far described would be all that is needed, but inasmuch as automatic terrain clearance compensation has been provided and makes use of substantially the full characteristic curve of the tube 304, it is necessary to change the number three grid bias of the tube for each of the three ranges. In other words, an airplane changing from low to high altitude within the lowest range will cause the negative bias of the tube to decrease from maximum, but at the transition point between the lowest range and the next higher range, the negative bias should be moved back again to maximum so that it may again compensate by decrease as the aircraft rises in the second range, and so on. It goes without saying that the changeover time for the grid bias must correspond exactly to the changeover time of the attenuator 361.

Referring again to Figure 23, the resistor 314' corresponds generally to the resistor 314 of Figure 21, but in the present case is provided with intermediate taps 366 and 368, in addition to the end tap 370. These are connected to switch contacts generally designated 372, while the attenuation control wires 360, 362, and 364 are connected to switch contacts generally designated 374. Contacts 372 are contacted by a movable contact arm 373, while contacts 374 are contacted by a movable contact arm 375. These arms are insulatedly carried on and are moved with a suitable control knob 376 located within reach of the operator, or the pilot if there is no special operator.

A terrain clearance indicator is shown at 378 and is responsive to the terrain clearance throughout all of the ranges. The operator may use the indicator 378 to determine which position of changeover switch 376 is to be used.

The operation of the circuit may be illustrated by the following example: Suppose the aircraft is ascending from a very low altitude to a somewhat higher altitude in the first, or lowest, range. For that range the switch 376 should be in the position shown. As it ascends, the current through resistor 314' increases, thereby increasing the potential at tap 370, and so increasing the counteracting potential, and therefore decreasing the negative potential on the number three grid of tube 304. Inasmuch as the ascent of the aircraft decreases the response of the field intensity receiver 306', for a constant reflection coefficient the amplification in tube 304 should be increased, and this is accomplished by the decrease in negative bias.

As the plane ascends and moves from the first altitude range into the second altitude range, the potential supply from resistor 314' to the number three grid of the tube must be sharply decreased from maximum value to one-tenth that value. Changeover switch 376 is turned counter-clockwise from the position shown to the middle position, whereupon the number three grid is biased from tap 366 instead of tap 370, thereby making the necessary potential reduction. At the same time, the change from conductor 364 to conductor 362 causes movement of the remotely-controlled attenuator, thereby increasing the output from receiver 306' to ten times the immediately preceding value. The oscilloscope indication is therefore unchanged, which is as it should be.

Similar remark applies to the movement of changeover switch 376 to the third or highest range, at which time a bias is obtained from tap 368 which bias provides about one-tenth the potential provided by tap 366, and the gain in receiver 306' is again increased ten-fold.

Figure 24:
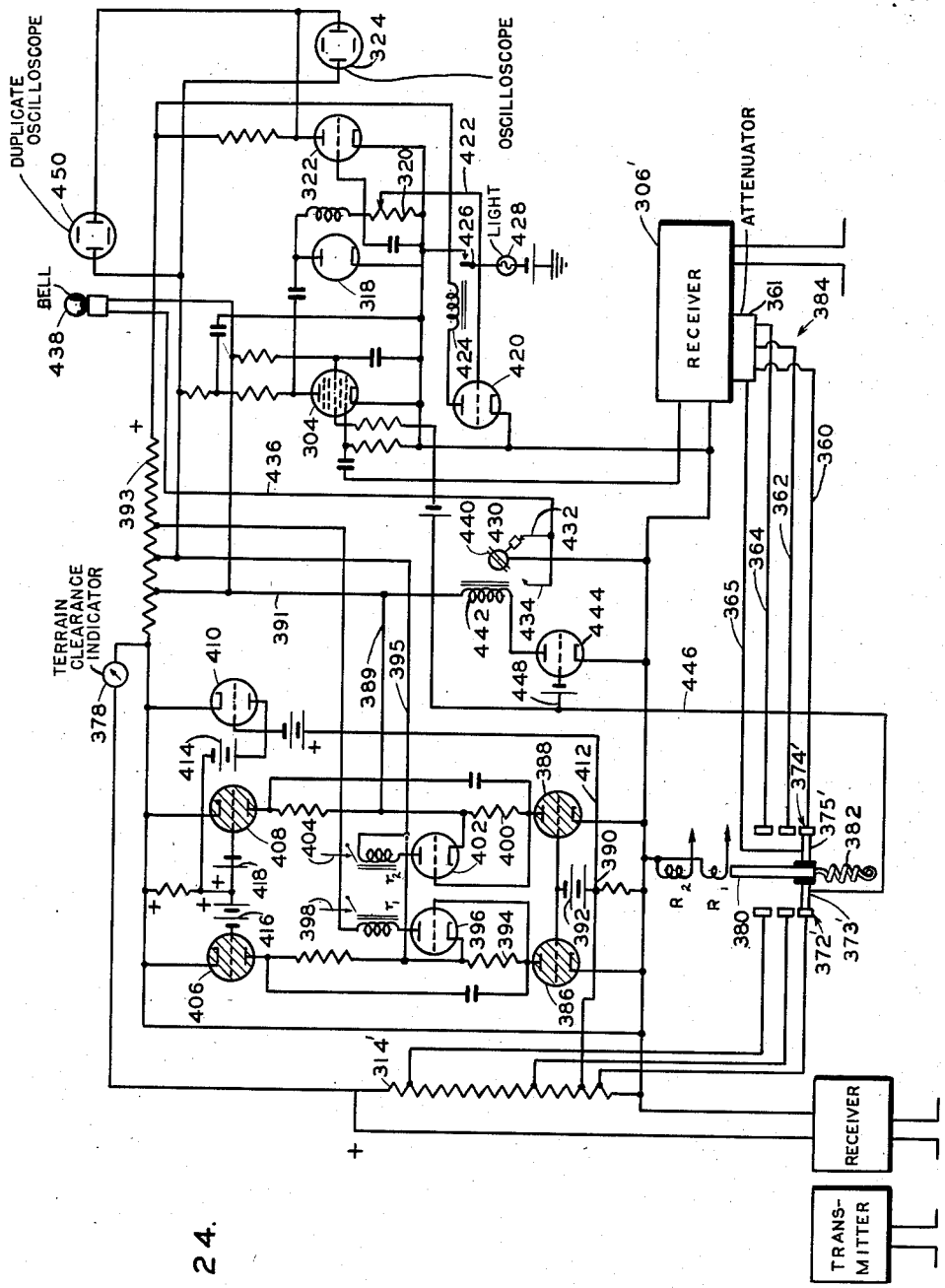
Figure 24 shows a more complex circuit arranged for automatic switching.

A somewhat more elaborate circuit which provides for automatic changeover from one altitude range to another is shown in Figure 24. Referring to that figure, the tubes 304, 318, 322, and oscilloscope 324 all correspond to the similarly numbered parts in Figures 21 and 23. Other surrounding circuit elements with corresponding numerals also have the functions previously described.

In the present case, the control wires 360 through 365, for remotely controlling the attenuator of receiver 306', run to a set of contacts 374' of a solenoid-operated switch. The taps on the terrain clearance resistor 314' run to a set of contacts 372'. The movable contact arms 373' and 375' are insulatedly carried by a solenoid core 380, which is normally urged downwardly by a spring 382, so as to engage the lowermost contacts, but which is pulled part way upward to the intermediate contacts when the solenoid winding $R_1$ is energized, and which is pulled all the way upward to the uppermost contacts when both the solenoids $R_1$ and $R_2$ are energized. It will be understood that the connections to the contacts 372' and 374' are suitably reversed one relative to the other, compared to Figure 23 (which used opposite rotational movement of diametrically-related contact arms 373 and 375). In the present case this reversal of connections is schematically shown by the crossovers at 384.

It will be understood that the solenoid arrangement shown in Figure 24 is merely symbolic of many such possible mechanical arrangements, and that solenoids may be used to move a rotatable switch, as in Figure 23, instead of providing a linear movement as in Figure 24.

When the aircraft is flying in the lowest altitude range, neither coil $R_1$ nor $R_2$ is energized. On transition from the lowest to the next highest altitude range, the coil $R_1$ is energized, and on transition to the highest altitude range, the coil $R_2$ is additionally energized. This desired result is obtained in the present case by the use of thyratron switching tubes. Thyratron tubes have the advantage of changing instantly from open circuit to closed circuit at an accurately determined grid potential, and I therefore prefer to use such tubes despite the accompanying disadvantage that they remain conductive when once made so.

Another feature of a thyratron tube is that the grid potential at which it fires is a function of the anode potential, and in accordance with the present invention, the first thyratron tube, controlling solenoid R₁, is provided with a higher plate potential than the second thyratron tube, controlling solenoid R₂, so that the first will fire at a lower positive grid potential, while the second requires a higher positive grid potential to fire. A potential from the terrain clearance resistor may be applied to the grids of the thyratrons, this potential being so selected that neither thyratron fires in the lowest altitude range; the first thyratron fires in the next altitude range; and the second thyratron additionally fires in the highest altitude range. In Figure 24 the first thyratron is indicated at 386, and the second at 388. The connection of the grids to the terrain clearance resistor 314' is provided by conductor 390, the actual grid potential being further determined by a grid bias battery 392. The anode potential for thyratron 388 is provided by means of leads 389 and 391 connected to the voltage dividing resistor 393 of a suitable power supply unit. The anode supply for thyratron 386 is provided by means of a conductor 395 which is tapped onto the voltage divider 393 at a higher positive potential point than the wire 391. In this way thyratron 386 is made ready to be fired at a lower positive grid potential than the thyratron 388.

As so far described, it might be assumed that relays R₁ and R₂ would be energized by the thyratron circuits directly. However, inasmuch as I wish the changeover point to be very accurately determined, I wish to hold the thyratron potentials closely to fixed values, and therefore do not use the same as substantial current carrying devices. With this object in view, thyratron 386 is connected to a plate impedance 394, the potential across which is used on the grid of an amplifier tube 396, the plate circuit of which may be used for the coil R₁ or, as here shown, may be used for a more sensitive relay r₁, which in turn controls a local circuit only fragmentarily represented at 398, which circuit runs to the solenoid coil R₁. In similar fashion thyratron 388, through plate impedance 400, controls the grid of an amplifier tube 402, the output circuit of which drives a sensitive relay r₂, which in turn controls a local circuit fragmentarily shown at 404, which circuit extends to the other solenoid coil R₂. With a circuit wired as here shown, the coils of the sensitive relays r₁ and r₂ are normally energized, while the local circuits 398 and 404 are normally open, so that the solenoid coils R₁ and R₂ are normally deenergized. Upon firing of the thyratron 386 a high negative potential is applied to the grid of the amplifier tube 396, which thereupon becomes nonconducting, thus opening the magnet of relay r₁ and so closing the circuit of solenoid coil R₁.

In addition to the means already described, it is also necessary to provide means to open the thyratrons during descent of the aircraft. For this purpose I provide auxiliary thyratrons which are connected to the main thyratrons 386 and 388 by a known inverter circuit. I also provide a phase-changing tube connected between the grids of the main tubes and the grids of the auxiliary tubes so that the latter will fire in reverse sequence as the plane descends.

Referring to Figure 24, the auxiliary thyratrons are shown at 406 and 408, while the phase-changing tube is indicated at 410. The conductor 390 leading to the terrain clearance resistor 314' is extended by a conductor 412, which leads to the grid of phase-changing tube 410. The anode of tube 410 is connected through a battery 414 to the grids of thyratrons 406, 408, the grid potentials being additionally fixed by batteries 416 and 418. These are different in value and are made necessary because auxiliary thyratron 408, which should fire first during descent, has the lower plate potential, while thyratron 406, which should fire second, has the higher plate potential. This is so because main thyratron 386 and its auxiliary thyratron 406 have the same plate potential connection, and main thyratron 388 and auxiliary thyratron 408 have the same plate potential. The phase-changing tube 410 provides a negative grid potential which decreases as the plane descends, and grid battery 418 is so selected that auxiliary thyratron 408 will fire when the aircraft passes the transition point between the highest altitude range and the medium altitude range. At this time, the second auxiliary thyratron 406 is unable to fire because its grid has been made more negative by the inserted battery 416. When auxiliary thyratron 408 fires, the main thyratron 388 opens and solenoid coil R₂ is deenergized, thus permitting the changeover switch to move from the top to the middle position. As the aircraft descends further and reaches the transition point between the medium range and the low range, the auxiliary thyratron 406 fires, thus opening the main thyratron 386 and so opening the solenoid coil R₁, whereupon the changeover switch descends to the lowermost position shown in the drawing.

It is necessary for the main and the auxiliary thyratrons to have slightly different points of operation, as far as upward and downward switching are concerned. This prevents oscillation at the point of switching. Specifically, during descent auxiliary thyratron 408 should fire at a clearance slightly less than main thyratron 388, so that when the firing of thyratron 408 opens thyratron 388, the latter will not attempt to immediately again fire, as it would if no difference in clearance were provided. Similarly, auxiliary thyratron 406 should fire at a terrain clearance slightly less than main thyratron 386.

The circuit shown in Figure 24 includes several added refinements. One of these is a signal to warn the pilot or observer when the aircraft is passing over a region having a high reflection coefficient. For this purpose, I have provided a tube 420, the grid of which is connected by a conductor 422 to the resistor 320 in the diode circuit. The anode circuit of tube 420 is connected to a normally energized relay coil 424. The armature 426 of the relay controls a local circuit for energizing a red light 428, or other warning signal. It will be understood that with a high reflection coefficient there will be a strong negative potential across resistor 320, a desired part of which may be selected by an adjustable tap as shown to control the tube 420, the latter being cut off and so deenergizing coil 424, thereby releasing armature 426 and closing the lamp circuit.

Another refinement in Figure 24 is the provision of a warning signal to caution the pilot when he happens to be flying at a transition altitude, for in that case the thyratron changeover mechanism will hunt back and forth in an undesirable manner. For this purpose I have provided a meter relay generally designated 430, said relay closing a contact 432 when the terrain clearance is at one transition point, say 250 feet, and closing another contact 434 when the terrain clearance is at another transition point, say 2,500 feet. In either case a circuit is provided through conductor 436 to a bell 438, or other suitable warning device. The moving coil 440 of the meter relay is acted on by a field coil 442, connected in the plate circuit of a tube 444. The terrain clearance potential, which normally runs through conductor 446 to the number three grid of tube 304, is also applied by a connection 448 to the grid of tube 444. The contacts 432 and 434 are set to be closed when the terrain clearance potential is either a maximum or a minimum, thus energizing the signal 438 at either of the two transition heights, whether approached from above or below.

The duplicate oscilloscope 450 corresponds to the duplicate oscilloscope 300 shown in Figure 4, and is merely intended to permit the pilot or observer to see what the terrain reflection coefficient is at any time.

As so far described, the correction for changes in terrain clearance have been made in linear relation, and it is assumed that the field intensity receivers 306 or 306' referred to operate in accordance with electric field intensity. I shall next describe circuits for work at exceedingly high frequencies, that is, with receivers requiring field power for response, rather than electric field intensity. Inasmuch as field power varies inversely with the square of the distance, it is necessary to provide a square law compensation.

The received reflected signal may be expressed by the following equation:

(1) $$P = \frac{KW}{(2H)^2} A$$

where

P is the received signal strength,
K is the coefficient of reflection,
W is the transmitted signal strength,
H is the terrain clearance, and
A is a constant.

Considering the transmitted signal to be constant, eliminating the numerical constant, and rearranging the formula, we obtain (2) $$K = \frac{P}{B} H^2$$

where B is a different constant. This may be expressed logarithmically by the expression (3) $$\text{Log } K = \log \frac{P}{B} + 2 \log H$$

The circuit of Figure 8 is designed to compensate in accordance with a square law and, more specifically, to convert the signal intensity and the terrain clearance to logarithmic quantities, and to add the logarithmic quantities in order to determine the logarithm of the reflection coefficient.

Referring now to Figure 8, transmitter 100 is frequency-modulated, as previously explained. Receiver 102 provides a current proportional to the terrain clearance, and this is fed to a resistor across the input circuit of a tube 104. Tube 104 is a so-called "variable mu tube," the amplification characteristic of which is logarithmic. The characteristic of such a tube is shown in Figure 7, and it will be seen that uniform changes in grid potential $E_g$ produce logarithmic changes in plate current $I_p$. It is convenient to think of any logarithmic scale as being either compressed or expanded. It is compressed when changing from linear values to logarithmic values, and it is expanded when changing from logarithmic values to linear values. Thus, in Figure 7 the grid changes should be negative or toward the left when seeking to change linear values to logarithmic values.

The circuit of Figure 8 is complicated by making use of alternating currents, but far simpler circuits are described later in connection with Figures 12 and 13, said circuits making use of direct current for one or both variable factors.

In Figure 8 an alternating current from transformer secondary 101 is fed to the input circuit of tube 104 after passing through a limiter 103. For this purpose I employ an input resistor 105, and a blocking condenser 107. The magnitude of the alternating current depends on the D.-C. bias applied to the grid of tube 104 from the terrain clearance receiver 102. The output of tube 104 is developed as a potential across resistor 106, and the A.-C. component is fed through a blocking condenser 108 to a diode rectifier 110. The output of the rectifier flows through a combining resistor 112.

The purpose of the limiter 103 is to provide a constant stable A.-C. input amplitude. Good voltage regulation is essential in order to make the results dependable. It will be understood that the bias of the tubes is properly adjusted to employ a desired part of the logarithmic tube characteristic.

The reflection coefficient receiver 114 provides a D.-C. output potential which biases the grid of another variable mu tube 116. The arrangement is symmetrical, the A.-C. input to tube 116 being the same as the A.-C. input to tube 104, the conductors 109 and 111 being in shunt to the input conductors for tube 104. Blocking condenser 113 and its associated D.-C. input resistor correspond to blocking condenser 107 with its resistor. However, the output resistor 118 of tube 116 is tapped at its mid-point. The halved A.-C. output is fed through a condenser 120 to another diode rectifier 122. The rectified output flows through the previously-mentioned combining resistor 112. With this arrangement the two rectified output currents are logarithmic, and are added to one another in resistor 112. The terrain clearance factor has double the effect of the reflected signal factor, because of the mid-tap on resistor 118. The current through resistor 112 and therefore the potential developed across the same are accordingly proportional to the logarithm of the reflection coefficient K, in accordance with Formula 3 above. If the receiver has a detector working in accordance with a cube law, then resistor 118 may be tapped for one-third instead of one-half its total value, this being a great advantage of the logarithmic arrangement here shown.

In Equations 2 and 3 above, it will be seen that the right-hand side of the equation is divided by a constant, which it is most convenient to place beneath the P factor (because the H factor is squared), and in Figure 8 this desired division is obtained by means of a dividing resistor 115 (which after proper preliminary adjustment may remain fixed). It is because of this use of a dividing resistor in Figure 8 and succeeding figures that Equations 2 and 3 have been expressed in the particular form shown.

The combined potential (log K) is applied to the oscilloscope, preferably through a linear amplifier tube 124, the output of which is fed through conductor 126 to deflection plate 128. The opposite deflection plate is connected through wire 130 to the main voltage divider resistor 132 of the D.-C. power supply unit 134. Conductor 126 is also connected to a higher voltage point on divider resistor 132, through a resistor 136. Thus a suitable potential is applied to the deflecting electrodes in opposition to the potential supplied by tube 124. The purpose of this opposed arrangement is to permit the oscilloscope spot to be deflected either side of center, so that a scale extending all the way across the screen of the oscilloscope may be used, as shown in Figures 2 and 3. From another viewpoint it may be said that the voltage from the voltage divider resistor 132 is a biasing voltage, which biases the spot to the left side of the screen in the absence of reflection coefficient potential from tube 124.

The direction of the D.-C. from the reflection coefficient receiver 114 is such that an increase of power intensity provides a greater negative voltage to bias the tube 116. This reduces the A.-C. output from tube 116, and because of the nature of the tube, the amplitude of the A.-C. output is logarithmically compressed. Rectifier 122 thus produces a reduced rectified current which in turn reduces the voltage across the combining resistor 112. There is accordingly an increased voltage drop in the output resistor 136 of linear amplifying tube 124, thereby making the electrode connected to wire 126 more negative, and so causing the oscilloscope spot to move toward the opposite electrode. In the case of variable mu tube 104, an increase in terrain clearance (H) should also provide a more negative bias for tube 104.

It will be understood that with the arrangement here described the scale on the oscilloscope screen will be a logarithmic scale, as shown in Figure 3, instead of a uniform scale as shown in Figure 2. This is so because the output is proportional to the logarithm of the reflection coefficient, instead of being proportional to the reflection coefficient itself.

It is common to provide airplanes with a 400-cycle generator for radio purposes. Such a supply source is indicated in Figure 8 at 140. A 400-cycle current taken from a secondary 142 is applied through conductors 144 to deflecting plates 146. This provides sweep for the spot, and it is therefore unnecessary to include a special sweep wave generator. In practice the secondary 142 would be protected from the adjacent secondaries by the provision of suitable circuit refinements, including blocking condensers, etc. in a manner well known in the art. These have been omitted in Figure 8 in order to simplify the diagram.

The aerial camera 150, terrain motion picture camera 152, and oscilloscope camera 154, all under control of a common intervalometer 156, correspond to those described in Figure 4. In passing, it may be mentioned that the intervalometer need not necessarily drive the motion picture camera. If an intervalometer of feeble torque is employed, it will be used merely to synchronize the regular motion picture camera motor. However, if an intervalometer having adequate output is available, it may itself be used as the driving motor for the motion picture camera.

In Figure 8 neither manual nor automatic marker means for the film have been shown. An automatic marker for indicating synchronism with the large camera is illustrated in Figure 9, in which it will be seen that an attenuator resistor 160 is connected across the wires 144 leading to the sweep electrodes. A normally closed switch 162 is connected in series with attenuator 160 and is mechanically arranged for actuation together with the aerial camera switch 164 operated by cam 166 of intervalometer 156. With this arrangement, the attenuator circuit 160 is opened each time the aerial camera is exposed, thereby increasing the sweep of the spot.

A modified and somewhat more elaborate circuit is schematically shown in Figure 10. One difference has to do with the mounting of the apparatus. As so far described, the various components of the apparatus have been assumed rigidly mounted in the aircraft, pointing vertically downward when the aircraft is in level flight. As a refinement, however, the apparatus elements may be mounted on a common base or panel schematically indicated at 170 in Figure 10, the said panel being suspended from gimbals which permit the apparatus to point downwardly regardless of the position of the aircraft. A mounting using only fore and aft pivots may be used to take care of banking, for that is the most important. Any such gimbal or pivot arrangement may be further refined by the provision of stabilizing mechanism 172, using motor-driven control mechanism for leveling the base 170. A double gimbal arrangement may be used to keep the panel level in both directions. Such arrangements have already been developed for other purposes, and in fact have been used with an aerial camera. The motor-driven arrangement has the advantage over a simple suspended arrangement in being less subject to oscillation and hunting.

It should be understood that the refinement of movable mounting is not essential because the coefficient of reflection will not change materially if the angle of incidence changes within small limits from normal. This is so because the reflection from earth is scattered, and not sharply directional as though from a plane mirror surface. The intensity variation due to a change in position of the plane may also be compensated by providing an appropriate electrical network, which is varied in response to the tilting of the plane (either banking, or angle of attack, or both). This can be done readily within a limited range, say plus or minus 15 degrees. In this way only an instrument part need be gimbal-mounted, instead of the whole apparatus. However, it is not essential to use either the mechanical or the electrical compensation referred to above, not only because the error within small angles is small, but also because the pilot will be able in most cases to maintain reasonably level flight.

Another difference in Figure 10 is the use of a single motion picture camera of the sound-recording type, instead of two motion picture cameras. The motion picture camera 174 includes a sound-recording head, but only the rollers or film-moving portion, and perhaps part of the optical system, of the sound-recording head are used. The trace on oscilloscope 176 is projected through some lens system, schematically represented at 178. This will produce a continuous line instead of a series of intermittent lines. Inasmuch as intermittent lines may have some advantage in facilitating subsequent counting ahead from a reflection displacement to a corresponding picture frame, the desired result of interrupting the continuous line may be obtained electrically, instead of by means of a mechanical shutter as is done when using a second motion picture camera. This is schematically shown in Figure 10, in which the camera 174 operates a switch housed at 180, said switch controlling a bias potential applied to the intensity grid of the oscilloscope 176 by a connection 182. The intensity grid is normally biased negative and cuts off the spot of the oscilloscope. However, at the instant of exposure of the camera, the switch 180 is operated to reduce the negative bias on the intensity grid, and so to permit spot formation. In effect the film, though moved continuously, is electrically "shuttered."

A detail in Figure 10 not found in Figure 8 is the use of a rectifier 184, which doubles the frequency so that the sweep applied to the sweep electrodes of oscilloscope 176 has a frequency of 800 instead of 400 cycles. This 800-cycle energy is also used for the A.-C. input to the variable mu or exponential tubes 186 and 188. These and their circuits are the same as in Figure 8.

Still another refinement in Figure 10 is the introduction of means to convert the logarithmic reflection coefficient value to approximately its antilogarithmic value, thus providing deflection at the oscilloscope in accordance with a substantially uniform scale as shown in Figure 2, instead of the logarithmic scale shown in Figure 3. For this purpose I have provided a tube 190 of linear characteristic, having its output connected to the screen grid of a tube 192 of exponential characteristic. In this way tube 190 may be used to control the screen grid voltage of tube 192. The logarithmic potential developed across the combining resistor 194 is applied to the control grid of tube 190, and varies its output linearly, which in this case is logarithmic. The control grid-to-filament circuit of tube 192 is so biased as to permit the flow of grid current. The amount of grid current as a function of the screen grid voltage varies in accordance with a curved characteristic, and a portion of this is approximately exponential. This develops an approximately antilogarithmic potential across a resistor 195. The said potential is preferably amplified in an amplifying tube 196 having a linear characteristic, and the output of tube 196 is applied to the deflecting electrodes of oscilloscope 176 by means of conductor 198.

In Figure 10, as in Figure 8, marking means have been omitted in order not to further complicate the diagram. It may be pointed out, however, that with a continuous film movement as suggested in Figure 10, it is particularly convenient to use a change in trace width, rather than a change in trace length, to mark the exposure of the large camera. Such an arrangement is schematically shown in Figure 11, referring to which the potential on an intensity grid 177 is controlled by a suitable intensity control 200 by means of connection 202. The intensity grid 177 is normally negatively biased to cutoff. The intervalometer 204 is used to simultaneously operate a switch 206, in addition to a regular aerial camera switch 208. Each time the switch 206 is closed, the intensity control 200 supplies a greatly reduced negative bias (or a positive bias) to the intensity grid 177, thereby momentarily abnormally increasing the size of the spot. The intensity control 200 is also connected by means of conductors 210 to the shutter switch 180 previously referred to, said shutter switch being driven by the motion picture camera. This decreases the negative bias enough to permit normal spot formation each time the motion picture camera is exposed.

Figure 12 illustrates a modification of the invention which differs from the circuits previously discussed in two main respects. One feature is the elimination of A. C. in the logarithmic combining circuit, with consequent great simplification of that circuit. The other feature is an improved means for converting the logarithmic reflection coefficient value to its antilogarithmic value for use with a linear scale. Either of these features may be used independently, as well as both together as shown in Figure 12.

Referring to Figure 12, the terrain clearance current (from a terrain clearance unit) is connected to the terminals 212. The reflection current (from the field intensity unit) is connected to the terminals 214. A voltage-dividing resistance is used, like resistor 115 in Figure 8. Both currents are linearly-increasing currents. These currents are both D. C., and the tubes $V_1$ and $V_2$ are used as D.-C. amplifiers. The input potential for tube $V_1$ is provided across a resistor 216, and the input potential for tube $V_2$ is provided across a resistor 218. The D.-C. current supplied to these resistors is so poled that an increase of the factor being measured provides an increased negative potential on the grid of the tube. In other words, an increase of clearance (H) makes the grid of tube $V_1$ more negative, and an increase of reflection intensity (P) makes the grid of tube $V_2$ more negative.

The tubes $V_1$ and $V_2$ are variable mu tubes having an exponential characteristic, as was explained in connection with Figure 7. In Figure 7 it was seen that an increasing negative $E_g$ corresponds to a logarithmically-compressed $I_p$. $I_{p1}$ and $I_{p2}$ in Figure 12 are added in a combining resistor R.

$I_{p1}$ flows through the full length of combining resistor R. $I_{p2}$ flows through only one-half the length of combining resistor R, it being tapped at the mid-point 220. This method of adding the currents in a divided resistor makes the log H factor twice as effective as the log P factor, which is as it should be in accordance with Formula 3 above. The potential developed across the combining resistor R, made available at the terminals 222, is therefore a compressed potential which is a measure of log K, and may accordingly be applied to the deflection plates of an oscilloscope having a compressed or logarithmic scale, as shown in Figure 3.

It should be understood that this simplified D.-C. logarithmic combining circuit may be substituted for the A.-C. combining circuit shown in Figures 8 and 10.

The right-hand portion of Figure 12 shows means for changing log K to its antilogarithmic value for use with an oscilloscope having a linear scale. For this purpose I employ a third variable mu tube $V_3$ and, referring to Figure 7, I take advantage of the fact that if $E_g$ is varied in a positive direction (toward the right as viewed in Figure 7), an appropriate point and within proper limits on the characteristic curve, the $I_p$ will be approximately logarithmically-expanded, which is what is needed to convert a logarithmic value to its antilogarithmic value.

Now the log K potential ordinarily obtainable across the terminals 222 varies in decreasing negative sense. This is so because the input currents at 212 and 214 make the control electrodes of tubes $V_1$ and $V_2$ more negative, and therefore provide decreasing plate current and consequently decreasing potential across combining resistor R, and in respect to the cathode of tube $V_3$, this is a decreasing negative potential applied to the grid of tube $V_3$. The output current of tube $V_3$ is accordingly exponentially-expanded, as it should be. Tube $V_4$ is simply a linear amplifier tube, the output of which is applied to the deflecting electrodes of the oscilloscope 226.

The current relationships may also be illustrated by specific example. Suppose that the downwardly-directed radio wave is reflected from wire netting having a maximum coefficient of reflection. This produces a maximum negative $E_{g2}$ corresponding to minimum $I_{p2}$, which, in turn, provides minimum negative $E_{g3}$, which produces a maximum $I_{p3}$. This provides maximum negative $E_{g4}$, corresponding to minimum $I_{p4}$ flowing through resistor 228. Electrode 230 is connected through resistor 228 to the positive end 232 of voltage divider 224. Electrode 234 of the oscilloscope is connected to a more negative point 236 on voltage divider 224. With minimum current through resistor 228, there is minimum voltage loss thereacross, and therefore a maximum voltage from the point 232 is applied to electrode 230. The oscilloscope spot therefore moves to the right.

Now suppose the terrain is dry sand, with a very low reflection coefficient. This will provide a minimum negative $E_{g2}$, which produces a maximum $I_{p2}$, which in turn produces a maximum negative $E_{g3}$. This results in a minimum negative $E_{g3}$, which in turn produces a minimum negative $E_{g4}$, resulting in maximum $I_{p4}$. The drop or voltage loss across resistor 228 becomes a maximum, hence the positive potential on electrode 230 is greatly reduced, and the potential on electrode 234 becomes positive relative to that on electrode 230. The oscilloscope spot therefore moves to the left.

At any coefficient value intermediate these extremes, the spot will assume an intermediate position on the oscilloscope screen.

While reference has been made to the oscilloscope "spot" in the foregoing description, it will be understood that by merely putting any periodic wave on the other pair of electrodes, the spot will become a vertical trace, and it is this vertical trace that will be moved toward the right or toward the left, as described above. The shape of the periodic wave is unimportant, and an ordinary sine wave may be used. The period is preferably shorter than the picture exposure time, so that a full trace will be shown on the picture.

It should be understood that the right-hand portion of Figure 12, showing means to change the logarithmic value log K to its antilogarithmic value, may be used with other means to obtain log K, for example, that shown in Figures 8 and 10.

Another simplified circuit for compensating for terrain clearance is illustrated in Figure 13. This circuit uses only one exponential tube and is based on the theory that if the reflected wave is fed into the tube as an A.-C. wave, and if at the same time the terrain clearance current is a D.-C. current used to bias the tube, the output of the tube can be properly varied to automatically compensate for changes in terrain clearance.

The idea underlying this circuit may be explained with reference to Figure 14, which shows an exponential characteristic curve 239. Assume that the aircraft while flying over uniform terrain changes from low to high altitude. At low altitude the reflected wave will be relatively intense, as indicated at 241, while at high altitude the reflected wave will be of much smaller amplitude, as indicated at 243. If now the output from the terrain clearance unit is a D.-C. which changes the bias of the tube, so that the bias is at 245 for the low altitude and is at 247 for the high altitude, the gain in the tube will be greatly changed, in exponential proportion. The input 241 will produce the output indicated at 249, and the input 243 will produce the output 251. With proper cailbration, that is, with the bias range properly located on the characteristic curve (and keeping the operation within proper limits on the characteristic curve), it will be found that the outputs 249 and 251 are exactly equal for equal reflection coefficients. In this arrangement the A.-C. amplitude is preferably kept small.

Referring now to Figure 13, the terrain clearance unit T includes a transmitter 253 and a receiver 255. It is here assumed that the terrain clearance unit is of the frequency-modulated type, and it is for this reason that the waves in Figure 14 are shown frequency-modulated. However, other terrain clearance units may be employed. In any case, a D.-C. varying linearly with terrain clearance is needed as an output from the unit 255. This D.-C. current is applied to a bias resistor 257. The R. F. output from the reflection coefficient receiver 259 is fed to the input circuit of a variable mu tube or exponential tube 261. The A.-C. output from tube 261 is led through a blocking condenser 263 to a diode rectifier 265. The rectified current developes a D.-C. potential across a resistor 267, which potential is applied to a linear amplifying tube 269. The resistor 267 is so connected in the circuit as to provide an increasing negative bias for increasing A.-C. input to the diode 265. The output from tube 269 flows through a resistor 271 connected in series with electrode 273 of oscilloscope 275. The opposite electrode 277 is connected to a lower or more negative point on the bias supply resistor 279, just as was described in connection with Figure 12.

It will be seen that for constant-altitude flight, an increase in reflection coefficient will cause a stronger A.-C. input to tube 261, which will increase the direct current through resistor 267, thereby biasing the tube 269 more negative, and so decreasing the current flow through resistor 271, thereby raising the potential on electrode 273, and so deflecting the oscilloscope spot or line to the right, which is as it should be.

In the foregoing description of Figure 13 it has been assumed that the exponent of the exponential characteristic curve is 2, whereas the most commonly available variable mu tube has an exponent $e$. One answer is to select or design a variable mu tube having the desired square-law curve. Another answer is to use only a reduced portion of the curve which closely approximates a square law. Still another answer is to employ two tubes in parallel in accordance with known practice, one of these tubes having the exponent $s$ and the other having a linear characteristic, or having the exponent $e$ but being operated at a different bias point. The two dissimilar curves are so combined that the mean or combined characteristic when using both tubes in parallel follows the desired square law.

In all cases the circuits must be adjusted or calibrated to proper common units. Specifically, the H factor, in terms of volts or microvolts, must be quantitatively correct for combination with the P factor.

Still another method for providing a square law compensation is illustrated in Figure 25. This arrangement is based on the fact that a square law relation can be obtained while using tubes having a linear characteristic, provided that two such tubes are used in cascade so that the gain at the output of the second tube will vary as the square of the gain in either tube. Thus, a linear biasing potential from the terrain clearance resistor may be applied simultaneously to both tubes in order to vary their gain equally and in accordance with the terrain clearance. The signal passes through the two tubes in cascade, and therefore will vary as the square of the terrain clearance.

Referring to Figure 25, the tubes 452 and 454 are preferably 6L7 tubes of the type previously referred to and having the characteristic shown in Figure 22, so that the gain in one tube varies linearly with decrease in negative bias. The number three grids of both tubes are connected through bias battery 456 to the terrain clearance resistor 458. The signal from receiver 460 is fed through a conductor 462 to the number one grid of tube 452. The output of tube 452 is fed through conductor 464 and blocking condenser 466 to the number one grid of tube 454. The output of tube 454 is rectified in a diode rectifier 265 and a D.-C. voltage is developed across diode resistor 267, these corresponding to the similarly numbered parts in Figure 13 previously described. The amplifier tube 269 and the oscilloscope 275 also correspond to the similarly numbered parts in Figure 13, and it is therefore unnecessary to explain the operation of these parts. The screen grids and suppressor grids of tubes 452 and 454 are connected as was already described in connection with Figure 21, it being remembered, however, that in the present case there are two pentagrid tubes connected in cascade. The terrain clearance indicator 470 is simply connected to the terrain clearance resistor 458 for observation by the pilot or observer, and his instrument board may also include a duplicate oscilloscope 472 which is connected in parallel with the main oscilloscope 275.

It will be understood that the circuit for automatic range switching may be used also with the logarithmic system of compensation. Specifically, the thyratron switching circuit at the left-hand part of Figure 24 may be used with the compensating circuit of Figure 25, exactly as described for Figure 24, even as to quantitative examples, because both require tapping of the terrain clearance resistor, at one-tenth, and then one-hundredth of its length. Moreover, by appropirate adjustment of the range value, the automatic switching circuit may be used with any of the compensator circuits shown in the other figures of the drawing.

Although the reflection coefficient has so far been indicated as being obtained by using C.-W. transmission and a reflection coefficient receiver, it will be understood that in that aspect of the invention which involves the juxtaposition of pictures of a reflection indication to pictures of the terrain from which the reflection has been obtained, other means may be used to obtain the reflection indication. One example is the known pulse-echo system, which can be made relatively small and portable for a very short range of only a few miles such as is here required. Such a scheme is schematically illustrated in Figure 15, referring to which a pulse-echo system is represented at 240, this being connected to an oscilloscope 242, which is photographed by auxiliary motion picture camera 244 geared to a downwardly-pointed motion picture camera 246, as previously explained in connection with Figures 8 and 10. A synchronously operated serial camera is also employed, as in Figures 8 and 10, but has been omitted in Figure 15 to save room in the drawing.

If a plane flies at an approximately uniform distance from the terrain, the oscilloscope screen may appear somewhat as shown in Figure 16, the pip 248 representing the transmitted pulse and the pip 250 the echo. The distance along the base-line on scale 252 is a measure of the terrain clearance. On passing over an ammunition dump or other largely metallic area, the echo pip will be much stronger, as indicated at 254 in Figure 17, and the change in height of the pip will direct suspicion at the terrain then covered.

If the plane flies lower, the echo pip will move toward the left, as shown at 256 in Figure 18. Passage over metallic deposits will heighten the echo pip, as shown at 258 in Figure 19. The change from Figure 16 to Figure 18 represents a change in altitude with no change in reflection coefficient. So also the change from Figure 17 to Figure 19 represents a change in altitude with no change in reflection coefficient.

Figure 20 illustrates a small section of the resulting motion picture film. When passing over normal terrain, the echo will be small, as shown at 260. When passing over metallic objects, the echo pip will grow, as shown at 262, 264. On again reaching normal terrain, the echo pip will shrink, as shown at 262′, 260′. In practice there may be a considerable number of exposures for each pip height. When the film is run off in a projector to view the same on a large screen, the growth in pip height will be seen, and the film may be stopped for closer examination, and for relation to the corresponding large picture taken by the aerial camera.

The pulse-echo system may, if desired, also be compensated for change in terrain clearance. This is not essential, however, because movement of the pip to one side or the other may be used by the observer to allow mentally for that change in pip height which would be due solely to change in terrain clearance.

The instrument or indicator 300, shown in Figure 4, may be used in connection with all of the other arrangements, though not shown in the other figures. It is simply a duplicate oscilloscope intended to be watched by the pilot or observer of the plane. This may be used to advantage by bombing planes flying at night or in foggy weather, for the observer would be able to determine when the bombing plane is directly over a concentrated metal target of interest by simply watching for maximum deflection in the instrument or oscilloscope. There would be the same advantage in daytime when dealing with an effectively camouflaged target.

It is believed that the construction, operation and method of using my improved apparatus for detection of changes in terrain reflection coefficient, as well as the many advantages thereof, will be apparent from the foregoing detailed description.

It should be understood that the apparatus may be mounted on means other than aircraft, as for example on a boat, in which case the directive radio waves may be tranmitted substantially horizontally with a view to detecting camouflaged metal aircraft warning towers mounted on a hostile shore, or to discovering other camouflaged enemy installations of interest. In fact, where camouflaged enemy installations are suspected of being provided on the face of a hill in mountainous country, portable apparatus of this character may be directed in searchlight fashion against the facing hill with a view to discovering possible camouflaged military installations.

In the description so far it has been suggested that an antenna array is used for the radiation of the electromagnetic wave. No particular frequency range is specified, except for the fact that it will necessarily be high so as to permit beaming within a narrow lobe, and also will be sufficiently high so that changes within terrain level are large compared to the wavelength used, to prevent scattering of the wave on the ground. On the other hand, the frequency choice may be influenced by a desire for penetration through a layer of low conductivity, as for example, through foliage, hay, or the like used as camouflage.

A variety of radiators other than a simple array may be used, depending on the magnitude of the wavelength used, as, for instance, horns or paraboloid radiators.

It is not necessary that the same transmitter and thus the same radio wave be used for the operation of both receivers of the system. It is possible to have separate units, one transmitter and receiver for the measurement of terrain clearance and another transmitter and receiver for the measurement of the intensity of the reflected wave. This might be desirable if, for instance, it is thought more convenient to use already available apparatus for the measurement of terrain clearance, operating on a specific frequency range, and if on the other hand a different frequency is more suitable for the determination of reflection coefficient.

It will therefore be apparent that while I have shown and described my invention in several forms, changes and modifications may be made in the structures disclosed without departing from the spirit of the invention as sought to be defined in the appended claims.

It will be understood that while in the claims I have for convenience referred to "terrain reflection," this is not intended to exclude horizontal reflection from camouflaged metallic towers or the like. Similarly, in such claims the term "terrain clearance responsive device" is not intended to exclude a distance responsive device operating in some direction other than vertical. Also, in referring to the apparatus as being "downwardly-directive," I do not intend to exclude the possibility of using the apparatus in other directions for other purposes such as those outlined above.

In the claims the expression "means for synchronously interrelating the exposures of the large aerial camera and the motion picture camera" is intended to apply to either the use of mechanical gearing for maintaining a desired speed ratio, or to the means whereby each exposure of the large camera is marked on the motion picture film.

I claim:
1. Apparatus to detect and to fix the location of changes in terrain reflection coefficient, said apparatus comprising a radio transmitter and receiver at least one of which is directive, an instrument connected to said receiver responsive to the intensity of the received terrain-reflected energy, means to render the response of said apparatus independent of its clearance from said terrain, a camera adapted for the periodic exposure of a film, said camera having an optical system for taking pictures of the terrain, and also having a second optical system for taking pictures of the aforesaid instrument.

2. Aircraft-carried apparatus to detect and to fix the location of changes in terrain reflection coefficient, said apparatus comprising a radio transmitter and receiver at least one of which is downwardly directive, an oscilloscope connected to said receiver responsive to the intensity of the received terrain-reflected energy, means to render the response of said apparatus independent of its clearance from said terrain, and a motion picture camera containing a film strip, said camera having a downwardly-pointed optical system for taking pictures of the terrain, and also having a second optical system for taking pictures of the screen of the aforesaid oscilloscope.

3. Aircraft-carried apparatus to detect and to fix the location of camouflaged metal objects, said apparatus comprising a downwardly-aimed radio wave, metal detector having a response that is independent of terrain clearance, an instrument responsive thereto, a camera adapted for periodic operation, said camera having a downwardly-pointed optical system for taking pictures of the terrain, and also having a second optical system for taking pictures of the aforesaid instrument, whereby indications by said detector of camouflaged metal objects are associated with related pictures of the camouflaged terrain.

4. Apparatus as defined in claim 1, wherein said means comprise an electronic terrain-clearance responsive device connected to the aforesaid receiver to so vary the amplification thereof as to compensate for changes in terrain clearance, whereby the instrument responds solely to changes in the reflection coefficient of the terrain, said terrain-clearance responsive device including the aforesaid radio transmitter, and a second receiver.

5. Apparatus as defined in claim 2, wherein said transmitter is frequency modulated, and wherein said means comprise an electronic terrain-clearance responsive device connected to the aforesaid receiver to so vary the amplification thereof as to compensate for changes in terrain clearance, said terrain-clearance responsive device including a receiver for heterodyning the transmitted and received frequencies so that the beat frequency is a function of the terrain-clearance.

6. Apparatus as set forth in claim 1, in which the instrument response is reproduced on a marginal portion of the film at one side of the picture frames.

7. Apparatus as set forth in claim 2, combined with a sweep wave source, the sweep wave from which is applied to the oscilloscope, for sweep in a direction transverse to the deflection caused by the reflection coefficient receiver.

8. Apparatus as set forth in claim 2, combined with a sweep wave source, the sweep wave from which is applied to the oscilloscope, for sweep in a direction transverse to the deflection caused by the reflection coefficient receiver, and in which the sweep is longitudinal of the film strip, whereby projection of the film produces a vertical trace which is sidewardly displaced at changes in terrain coefficient reflection.

9. Apparatus as set forth in claim 2, combined with a sweep wave source, the sweep wave from which is applied to the oscilloscope for sweep in a direction transverse to the deflection caused by the reflection coefficient receiver, and in which the resulting trace is photographed longitudinally of the film strip on a marginal portion thereof at one side of the picture frames, whereby projection of the film produces a vertical trace which is sidewardly displaced at changes in terrain coefficient reflection.

10. Apparatus as defined in claim 1, combined with a second camera, and appropriate gearing between said second camera and the first named camera for synchronizing the operation of the two cameras in desired speed ratio, the ratio preferably being such that the film in the second camera is exposed only a small fraction of the number of times that the first-named camera is exposed.

11. Apparatus as defined in claim 2, combined with a large aerial camera of conventional type with appropriate gearing between said large aerial camera and the motion picture camera for synchronizing the operation of the two cameras in desired speed ratio, the ratio preferably being such that the film in the large aerial camera is exposed only a small fraction of the number of times that the film in the motion picture camera is exposed.

12. Apparatus as defined in claim 2, combined with a large aerial camera of conventional type including an intervalometer, and appropriate gearing between said intervalometer and the aforesaid motion picture camera for synchronizing the operation of the two cameras in desired speed ratio, the ratio preferably being such that the film in the aerial camera is exposed only a small fraction of the number of times that the film in the motion picture camera is exposed.

13. Aircraft-carried apparatus to detect and to fix the location of changes in terrain reflection coefficient, said apparatus comprising a radio transmitter and receiver at least one of which is downwardly-directive, a terrain clearance altimeter having an output potential that is a function of the terrain clearance, a compensator circuit responsive thereto whereby the output of said receiver is rendered independent of terrain clearance, and an instrument responsive to the intensity of the received terrain-reflected energy, a motion picture camera, said camera having a downwardly-pointed optical system for taking pictures of the terrain, and also having a second optical system for taking pictures of the aforesaid instrument response, a large aerial camera, and appropriate gearing between said large aerial camera and the aforesaid motion picture camera for synchronizing the operation of the same in desired speed ratio.

14. Aircraft-carried apparatus to detect and to fix the location of changes in terrain reflection coefficient, said apparatus comprising a radio transmitter and receiver at lease one of which is downwardly-directive, a terrain clearance altimeter having an output potential that is a function of the terrain clearance, a compensator circuit responsive thereto whereby the output of said receiver is rendered independent of terrain clearance, and an instrument responsive to the intensity of the received terrain-reflected energy, a motion picture camera, said camera having a downwardly-pointed optical system for taking pictures of the terrain, and also having a second optical system for taking pictures of the aforesaid instrument response, a large aerial camera, and means whereby each exposure of the film in the large aerial camera is marked on the motion picture film.

15. Aircraft-carried apparatus to detect and to fix the location of changes in terrain reflection coefficient, said apparatus comprising a radio transmitter and receiver at least one of which is downwardly-directive, a terrain clearance altimeter having an output potential that is a function of the terrain clearance, a compensator circuit responsive thereto whereby the output of said receiver is rendered independent of terrain clearance, an oscilloscope responsive to the intensity of the received terrain-reflected energy, a motion picture camera, said camera having a downwardly-pointed optical system for taking pictures of the terrain and also having a second optical system for taking pictures of the oscilloscope screen, a sweep wave source for sweeping the oscilloscope spot in a direction transverse to the deflection caused by the reflection coefficient receiver and parallel to the direction of movement of the film, a large aerial camera, and appropriate means for synchronously interrelating the exposures of the film in said large aerial camera and the film in the aforesaid motion picture camera.

16. Aircraft-carried apparatus to detect and to fix the location of changes in terrain reflection coefficient, said apparatus comprising a radio transmitter and receiver at least one of which is downwardly-directive, an oscilloscope responsive to the intensity of the received terrain-reflected energy, a motion picture camera, said camera having a downwardly-pointed optical system for taking pictures of the terrain and also having a second optical system for taking pictures of the oscilloscope screen, an electronic terrain-clearance responsive device connected to the aforesaid receiver to so vary the amplification of said receiver as to compensate for changes in terrain clearance, a large aerial camera, and appropriate means for synchronously interrelating the operation of said large aerial camera with the operation of the aforesaid motion picture camera.

17. Aircraft-carried apparatus to detect and to fix the location of changes in terrain reflection coefficient, said apparatus comprising a radio transmitter and receiver at least one of which is downwardly-directive, an oscilloscope responsive to the intensity of the received terrain-reflected energy, a motion picture camera, said camera having a downwardly-pointed optical system for taking pictures of the terrain and also having a second optical system for taking pictures of the oscilloscope screen, an electronic terrain-clearance responsive device connected to the aforesaid receiver to so vary the amplification of said receiver as to compensate for changes in terrain clearance, said terrain-clearance responsive device including the aforesaid radio transmitter and a second receiver, a large aerial camera, and appropriate means for synchronously interrelating the exposures of said large aerial camera with the operation of the aforesaid motion picture camera.

18. Aircraft-carried apparatus to detect and to fix the location of changes in terrain reflection coefficient, said apparatus comprising a radio transmitter and receiver at least one of which is downwardly-directive, an oscilloscope responsive to the intensity of the received terrain-reflected energy, a motion picture camera, said camera having a downwardly-pointed optical system for taking pictures of the terrain and also having a second optical system for taking pictures of the oscilloscope screen, an electronic terrain-clearance responsive device connected to the aforesaid receiver to so vary the amplification of said receiver as to compensate for changes in terrain clearance, a sweep wave source for sweeping the oscilloscope spot in a direction transverse to the deflection caused by the reflection coefficient receiver and parallel to the direction of movement of the film, a large aerial camera, and appropriate means for synchronously interrelating the exposure of the film in the said large aerial camera with the exposure of the film in the aforesaid motion picture camera.

19. Aircraft-carried apparatus to detect and to fix the location of changes in terrain reflection coefficient, said apparatus comprising a radio transmitter and receiver at least one of which is downwardly-directive, an oscilloscope responsive to the intensity of the received terrain-reflected energy, a motion picture camera, said camera having a downwardly-pointed optical system for taking pictures of the terrain and also having a second optical system for taking pictures of the oscilloscope screen, an electronic terrain-clearance responsive device connected to the aforesaid receiver to so vary the amplification of said receiver as to compensate for changes in terrain clearance, said terrain-clearance responsive device including the aforesaid radio transmitter and a second receiver, a sweep wave source for sweeping the oscilloscope spot in a direction transverse to the deflection caused by the reflection coefficient receiver and parallel to the direction of movement of the film, the second optical system of said motion picture camera serving to record the oscilloscope trace on a marginal portion of the film at one side of the picture frames, a large aerial camera, an intervalometer, and appropriate gearing between said intervalometer and the aforesaid motion picture camera for synchronizing the operation of the same in desired speed ratio.

20. Apparatus as defined in claim 2 combined with manually operable means to make a distinguishing mark on the motion picture film in order to call attention to a point suspected by the observer as being of interest.

21. Apparatus as defined in claim 1 combined with a second camera, and additional means to impress a characteristic mark on the film of the first-named camera each time the large camera is exposed.

22. Apparatus to detect and measure changes in terrain reflection coefficient, said apparatus comprising a radio transmitter device for directing radio energy at terrain, a receiver device receptive of energy reflected from said terrain, at least one of which devices is directive, a terrain clearance responsive device receptive of energy reflected from said terrain, means to convert the output of said receiver device to a first potential having a value proportional to the logarithm of its output, means to convert the output of said terrain clearance responsive device to a second potential having a value proportional to the logarithm of its output, means to convert the output of said terrain clearance responsive device to a second potential having a value proportional to the logarithm of the terrain clearance, means to add said first and second potentials while amplifying the effect of said second potential relative to said first potential, and an instrument responsive to the combined value of said first and second potentials for indicating the reflection coefficient of the terrain independently of said terrain clearance.

23. Apparatus to detect and measure changes in terrain reflection coefficient, said apparatus comprising a radio transmitter device for directing radio energy at terrain, a receiver device receptive of energy reflected from said terrain, at least one of which devices is directive, a terrain clearance responsive device receptive of energy reflected from said terrain, means to convert the output of said receiver device to a first potential having a value proportional to the logarithm of its output, means to convert the output of said terrain clearance responsive device to a second potential having a value proportional to the logarithm of the terrain clearance, means to add said first and second potentials to produce a third potential while amplifying the effect of said second potential relative to said first potential, means to convert said third potential into a fourth potential having a value proportional to the antilogarithm of the value of said third potential, and an instrument responsive to the value of said fourth potential for indicating the reflection coefficient of the terrain on a substantially linear scale and independently of said terrain clearance.

24. Apparatus to detect and measure changes in terrain reflection coefficient, said apparatus comprising a radio transmitter device for directing radio energy at terrain, a receiver device receptive of energy reflected from said terrain, at least one of which devices is directive, a terrain clearance responsive device receptive of energy reflected from said terrain, means including a variable mu tube to convert the output of said receiver device to a first potential having a value proportional to the logarithm of its output, means including a variable mu tube to convert the output of said terrain clearance responsive device to a second potential having a value proportional to the logarithm of the terrain clearance, means to add said first and second potentials with the effect of said second potential doubled relative to said first potential, and an instrument responsive to the combined value of said first and second potentials for indicating the reflection coefficient of the terrain independently of said terrain clearance.

25. Apparatus to detect and measure changes in terrain reflection coefficient, said apparatus comprising a radio transmitter device for directing radio energy at said terrain, a receiver device receptive of energy reflected from said terrain, at least one of which devices is directive, a terrain clearance responsive device receptive of energy reflected from said terrain, means including a variable mu tube to convert the output of said receiver device to a first potential having a value proportional to the logarithm of its output, means including a variable mu tube to convert the output of said terrain clearance responsive device to a second potential having a value proportional to the logarithm of the terrain clearance, means to add said first and second potentials to produce a third potential with the effect of said second potential doubled relative to said first potential, means including a variable mu tube to convert said third potential into a fourth potential having a value proportional to the antilogarithm of the value of said third potential, and an instrument responsive to the value of said fourth potential for indicating the reflection coefficient of the terrain on a substantially linear scale and independently of said terrain clearance.

26. A system to determine the coefficient of reflection of an objective remote from said system, said system comprising means to produce a voltage that varies directly as the range of said system from said objective, means to produce a voltage that varies as the range and the coefficient of reflection of said objective, a multi-grid tube having a linear amplification factor, said first and second named means being connected to control grids of said tube whereby an output is obtained that is solely a function of said coefficient of reflection, and indicator means responsive to the output of said tube.

27. The system according to claim 26, and means to obtain a recording of said indicator means that is automatically correlated with a recording of said objective.

28. The system according to claim 26, including means to render uniform the response of said system through a plurality of stepped ranges.

References Cited in the file of this patent

UNITED STATES PATENTS

| | | |
|---|---|---|
| 1,420,440 | Moorhouse | June 20, 1922 |
| 1,585,591 | Lowy | May 18, 1926 |
| 1,826,299 | Chamberlin | Oct. 6, 1931 |
| 2,178,237 | Linder | Oct. 31, 1939 |
| 2,236,497 | Beers | Apr. 1, 1941 |
| 2,268,643 | Crosby | Jan. 6, 1942 |
| 2,323,534 | Goddard | July 6, 1943 |
| 2,412,631 | Rice | Dec. 17, 1946 |
| 2,428,351 | Ayres | Oct. 7, 1947 |
| 2,535,325 | Smeltzer | Dec. 26, 1950 |
| 2,552,232 | Sunstein | May 8, 1951 |
| 2,563,052 | MacSorley | Aug. 7, 1951 |